US008787676B2

(12) United States Patent
Tanaka

(10) Patent No.: US 8,787,676 B2
(45) Date of Patent: Jul. 22, 2014

(54) IMAGE PROCESSING APPARATUS, COMPUTER READABLE MEDIUM STORING PROGRAM, AND IMAGE PROCESSING METHOD

(75) Inventor: Eiichi Tanaka, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 503 days.

(21) Appl. No.: 13/029,635

(22) Filed: Feb. 17, 2011

(65) Prior Publication Data
US 2012/0033887 A1 Feb. 9, 2012

(30) Foreign Application Priority Data
Aug. 3, 2010 (JP) ................................. 2010-174515

(51) Int. Cl.
*G06K 9/48* (2006.01)
(52) U.S. Cl.
USPC ........... 382/197; 382/173; 382/176; 382/199; 382/218; 382/128
(58) Field of Classification Search
CPC ................ G06T 7/0083; G06T 7/0081; G06T 2207/20144; G06K 9/48; G06K 9/00456; H04N 1/40062
USPC .................. 382/197, 199, 218, 128, 173, 176
See application file for complete search history.

(56) References Cited

U.S. PATENT DOCUMENTS 6,249,604 B1 * 6/2001 Huttenlocher et al. ....... 382/174

FOREIGN PATENT DOCUMENTS

| JP | A-58-106665 | 6/1983 |
| JP | A-3-233786 | 10/1991 |
| JP | A-4-311283 | 11/1992 |
| JP | A-5-73718 | 3/1993 |
| JP | A-2000-90194 | 3/2000 |

OTHER PUBLICATIONS

O'Gorman, "The Document Spectrum for Page Layout Analysis," IEEE Transactions on Pattern Analysis and Machine Intelligence, Nov. 1993, pp. 1162-1173, vol. 15—No. 11.

* cited by examiner

*Primary Examiner* — Ruiping Li
(74) *Attorney, Agent, or Firm* — Oliff PLC

(57) ABSTRACT

An image processing apparatus includes a receiving unit, a path calculation unit, and a separation unit. The receiving unit receives an image including at least a character image. The path calculation unit calculates a separation path in the image received by the receiving unit. The separation path is a line segment that separates a character image from the image. The separation unit separates the image received by the receiving unit into plural character images using a separation path calculated by the path calculation unit. The path calculation unit calculates a separation path within a predetermined range including a portion of a character image in the image so that a cumulative value of luminance values of pixels along the separation path satisfies a predetermined condition.

13 Claims, 37 Drawing Sheets

FIG. 24
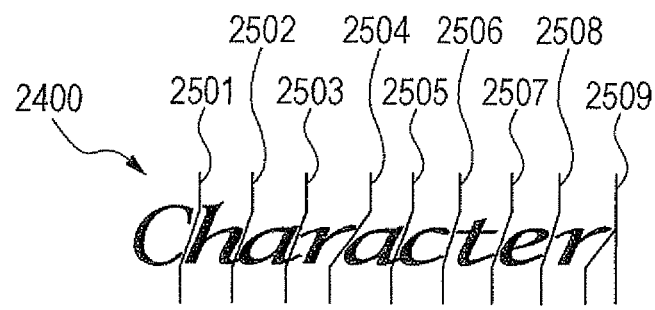
FIG. 25
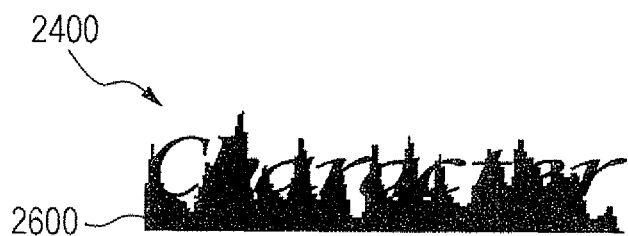
FIG. 26

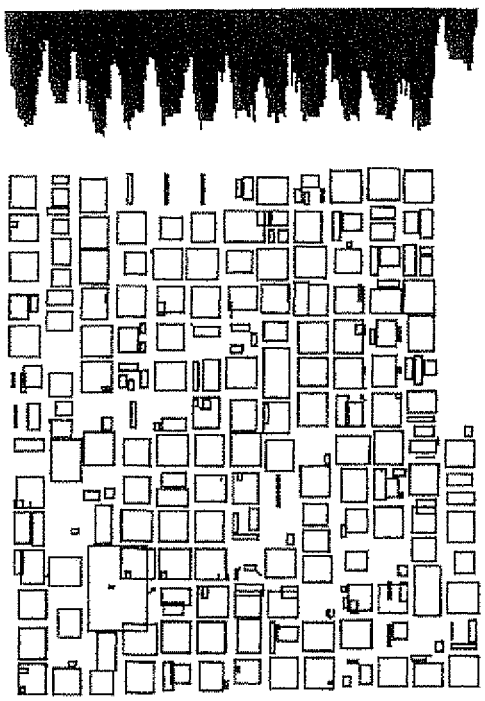
FIG. 35B
FIG. 35A

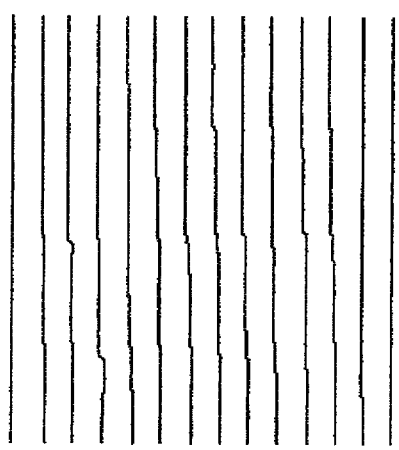

FIG. 37A
文字列切り出し
文字列切り出し
文字列切り出し
文字列切り出し
文字列切り出し
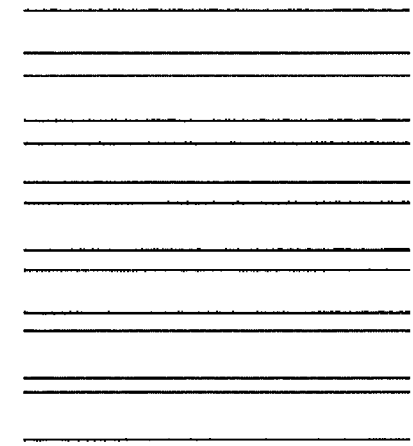
FIG. 37B
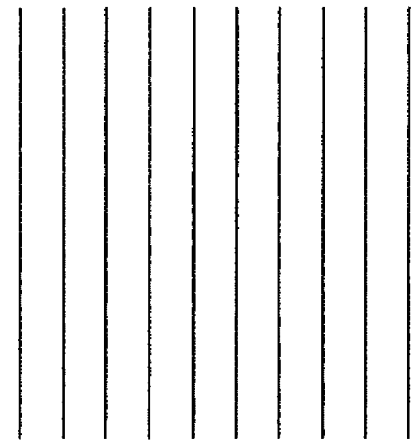
FIG. 37C FIG. 38A
単文字列の切り出し
FIG. 38B
FIG. 38C

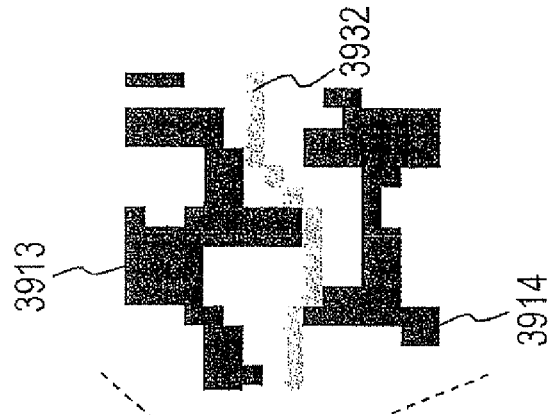
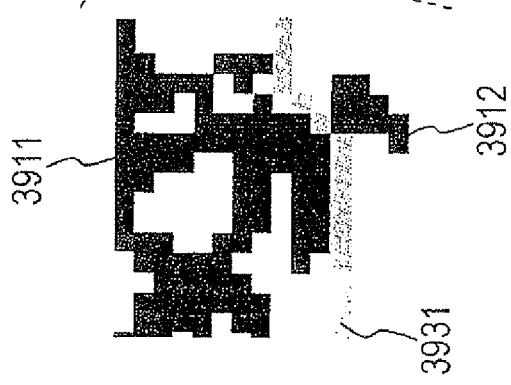

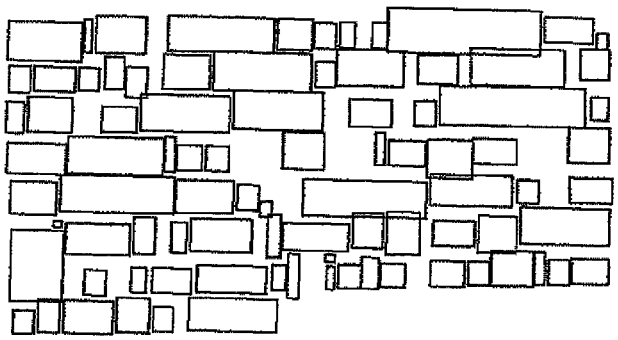

Optical character recognition, usually abbreviated to OCR, is the mechanical or electronic translation of images of handwritten, typewritten or printed text (usually captured by a scanner) into machine-editable text.

FIG. 40B

Optical character recognition, usually abbreviated to OCR, is the mechanical or electronic translation of images of handwritten, typewritten or printed text (usually captured by a scanner) into machine-editable text.

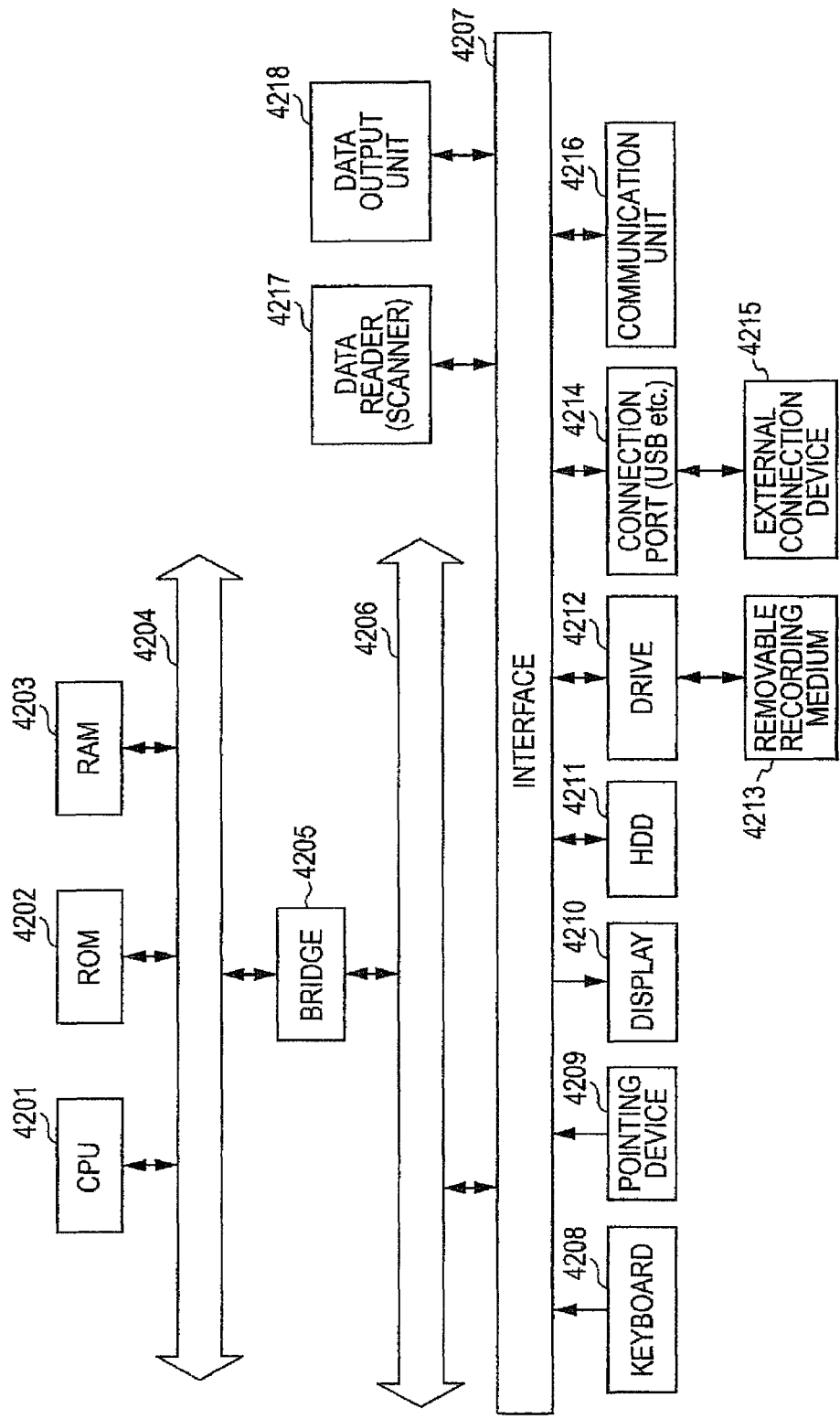

IMAGE PROCESSING APPARATUS, COMPUTER READABLE MEDIUM STORING PROGRAM, AND IMAGE PROCESSING METHOD

CROSS-REFERENCE TO RELATED APPLICATIONS

This application is based on and claims priority under 35 USC 119 from Japanese Patent Application No. 2010-174515 filed Aug. 3, 2010.

BACKGROUND (i) Technical Field

The present invention relates to an image processing apparatus, a computer readable medium storing a program, and an image processing method.

(ii) Related Art

Techniques for separating a target area in an image have been available.

SUMMARY

According to an aspect of the invention, there is provided an image processing apparatus including a receiving unit, a path calculation unit, and a separation unit. The receiving unit receives an image including at least a character image. The path calculation unit calculates a separation path in the image received by the receiving unit. The separation path is a line segment that separates a character image from the image. The separation unit separates the image received by the receiving unit into plural character images using a separation path calculated by the path calculation unit. The path calculation unit calculates a separation path within a predetermined range including a portion of a character image in the image so that a cumulative value of luminance values of pixels along the separation path satisfies a predetermined condition.

BRIEF DESCRIPTION OF THE DRAWINGS

Exemplary embodiment(s) of the present invention will be described in detail based on the following figures, wherein:

FIG. 24 illustrates an example of a target image;

FIG. 25 illustrates an example of the separation of the target image;

FIG. 26 illustrates an example of projection information of the target image;

FIGS. 35A and 35B illustrate an example of projection distribution;

FIGS. 36A to 36C illustrate an example of horizontal and vertical separations paths;

FIGS. 37A to 37C illustrate an example of horizontal and vertical separation paths;

FIGS. 38A to 38C illustrate an example of horizontal and vertical separation paths;

FIGS. 39A to 39C illustrate an example process according to the exemplary embodiment;

FIGS. 40A to 40C illustrate an example process according to the exemplary embodiment;

FIG. 41 illustrates an example process according to the exemplary embodiment; and FIG. 42 is a block diagram illustrating an example hardware configuration of a computer according to an exemplary embodiment of the present invention.

DETAILED DESCRIPTION

Figure 1:
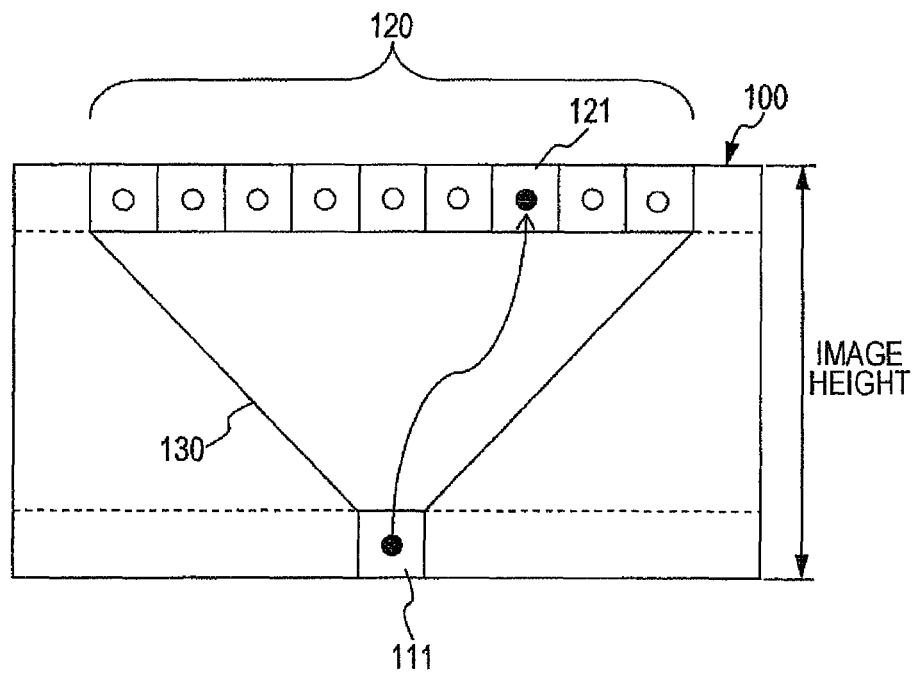
FIG. 1 illustrates an example of a path for separating an image into areas.

Exemplary embodiments of the present invention will be described in the following two sections, namely, <A> and <B>. In the section <A>, some of techniques that exemplary embodiments described in the section <B> are based on will be described.

<A> Basic Techniques

First, an overview of an exemplary embodiment given in the section <A> will be described.

This exemplary embodiment relates to an image processing apparatus configured to separate (or "cut out" or extract) an area from an image. The separation of an area may involve defining an outer boundary surrounding the area. An outer boundary surrounding an area may be defined using shortest paths. Using the shortest paths, the area may be separated from the image.

The term "shortest path", as used herein, means a line pattern which is a linear array of (positions of) pixels on a target image, and refers to a minimum-cost or maximum-cost path within a certain range, where cost is a cumulative value of the luminance values of pixels along a path. In particular, in this exemplary embodiment, as illustrated by way of example in FIG. 1, a shortest path may represent a part of an outer boundary separating an area from an image 100, and may be a path having a start point 111 and an end point 121. The start point 111 may be a pixel that is located in a lower end of the image 100. The end point 121 may be within end point candidates 120 defined in advance as a set of end point candidates, and may be a pixel that is located in an upper end of the image 100 and that is defined so that a cumulative value of the luminance values of pixels along a path is the minimum or maximum. Once the start point 111 and the end point candidate 120 are defined, a movement range 130 is defined.

The term "minimum cost" or "maximum cost", as used herein, may not necessarily be actually the minimum or maximum, and means a determination condition for the extraction of a path. In this terminology, the cost of a given path (cumulative value of the luminance values of pixels along the path) may be lower or higher than the cost of any other path. Therefore, the term "shortest path" means a path whose cost is the minimum or maximum in a certain range for comparison, and also means a path used as a determination condition for achieving the purpose of extracting a path that divides an image, regardless of whether the path is composed of a path whose cost is the second lowest or highest or the like or plural paths whose cost is the first and second lowest or highest and the like, unless otherwise specifically noted.

Next, the determination of a separation path using shortest path convergence will be described.

Figure 2:
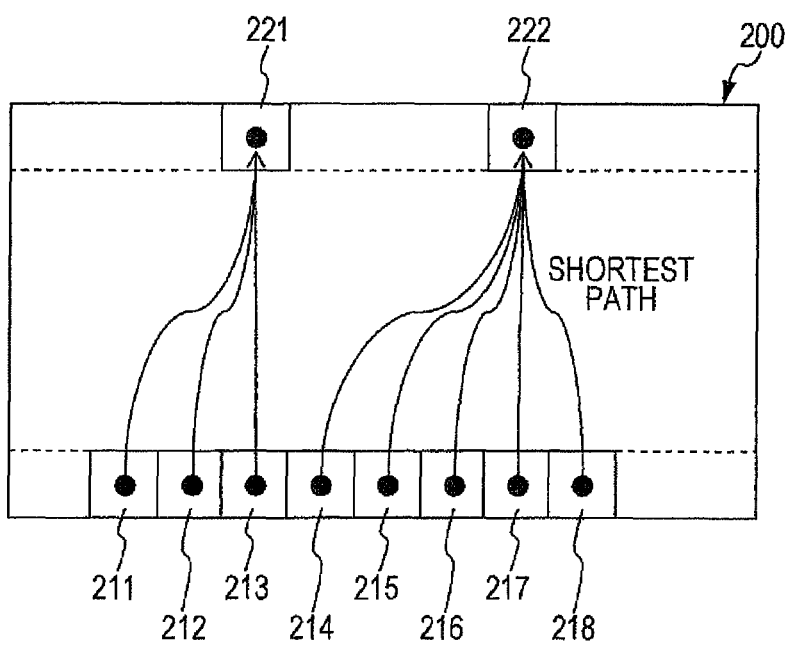
FIG. 2 illustrates an example in which plural path having different start points have the same end point.

In this exemplary embodiment, the calculation of the shortest path as defined above is based on the assumption that plural paths having different start points have the same end point (this state is hereinafter referred to as the "convergence of paths"). FIG. 2 schematically illustrates an example of the convergence of paths. In the example in FIG. 2, plural paths having different start points have the same end point. That is, in an image 200 as a target image, shortest paths starting from three start points 211 to 213 reach one end point 221, and shortest paths starting from five start points 214 to 218 reach one end point 222.

Hereinafter, a description will be given of an example in which a character string image including multiple single characters is received and the single characters are separated.

In this exemplary embodiment, paths for separating single characters in a character string image are calculated on the basis of information regarding shortest paths. In the related art, a process for extracting separated area candidates on the basis of projection information or connected components may take substantially the same role as the above process.

The determination of a separation path using the convergence of paths will be described hereinafter using an example illustrated in FIGS. 3 to 10.

Figure 3:
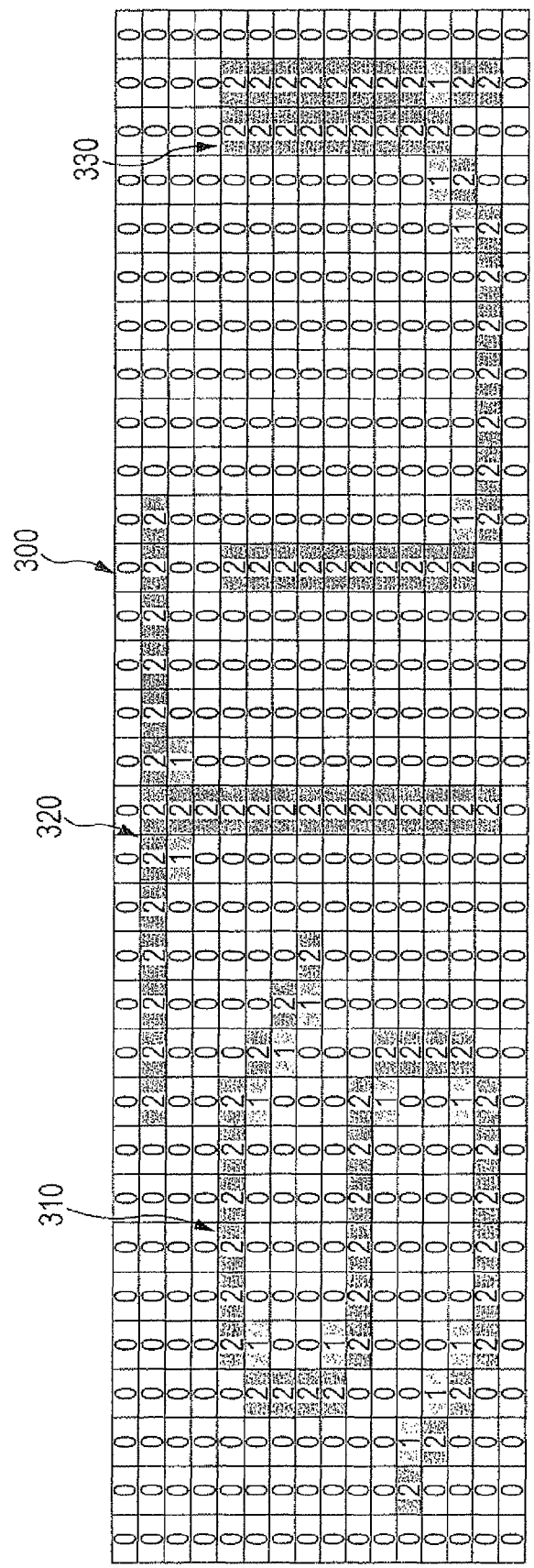
FIG. 3 illustrates an example of a target image.
Figure 4:
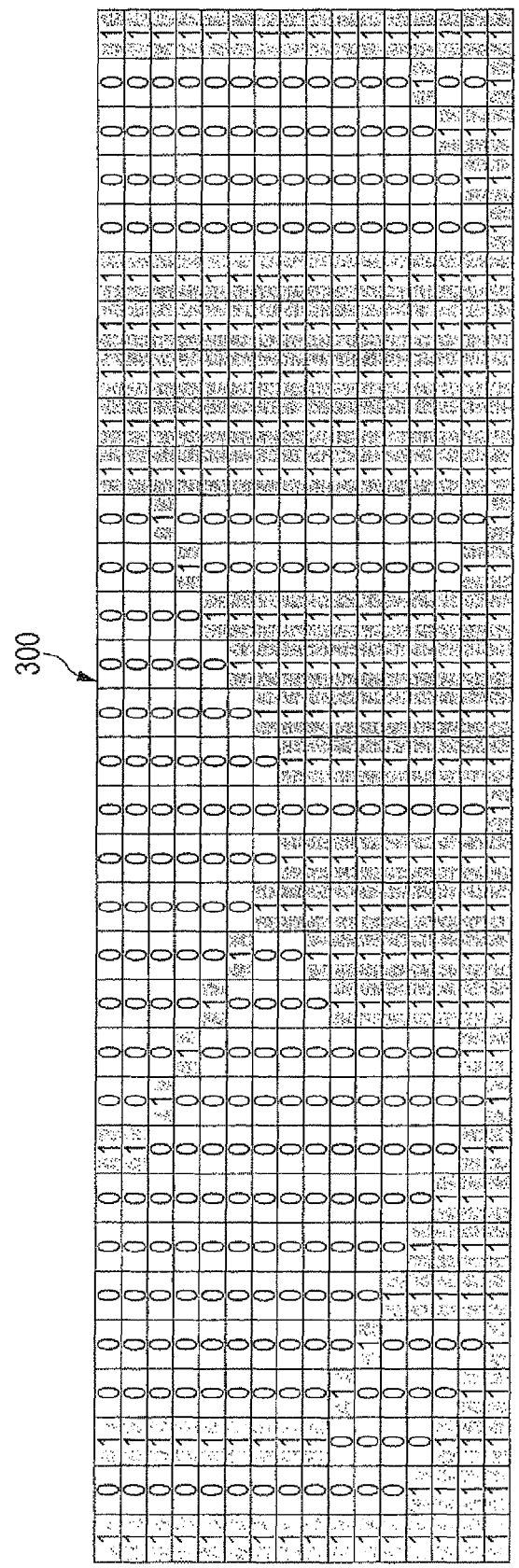
FIG. 4 illustrates an example of an upward shortest path.
Figure 5:
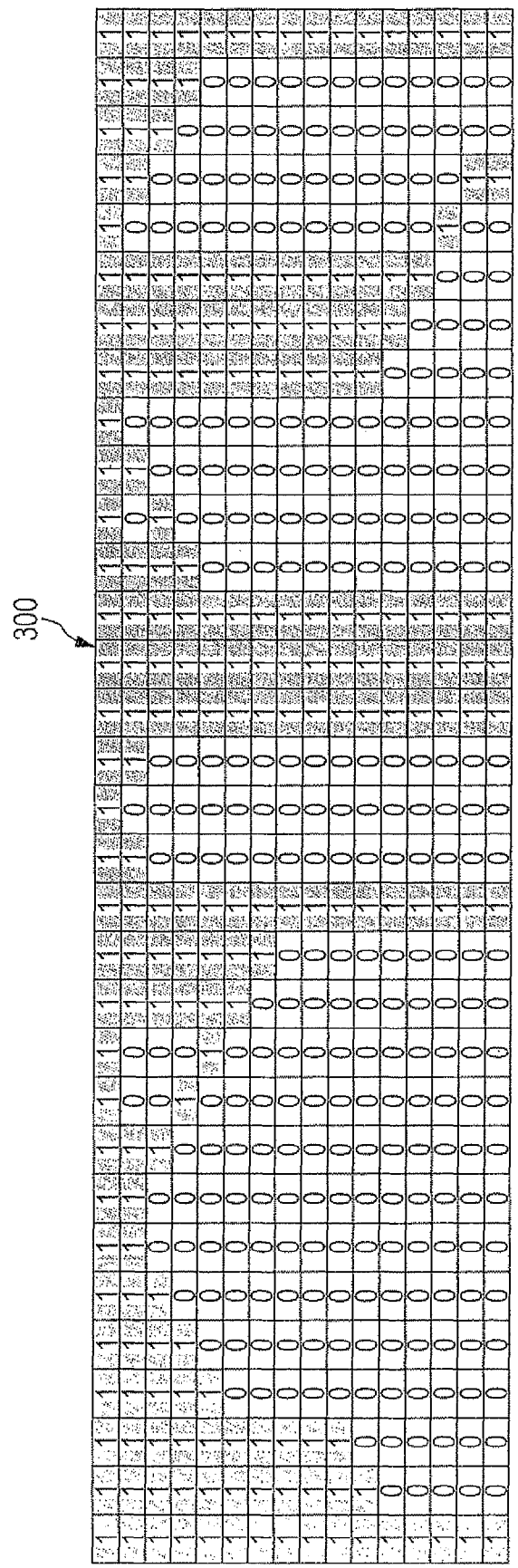
FIG. 5 illustrates an example of a downward shortest path.

FIG. 3 illustrates an example of a target image. An image 300 includes an "S" character image 310, a "T" character image 320, and a "U" character image 330, and the images 310 to 330 are overlapping patterns when mapped. Each individual cell represents a pixel, and the value of a cell represents the luminance value of a pixel. FIGS. 4 and 5 illustrate an example of shortest paths calculated in the example of FIG. 3. Cell values 1 and 0 indicate the existence and nonexistence of a path, respectively. In the example in FIG. 4, upward shortest paths starting from start points that are all the pixels in the lower end and reaching end points that are pixels in the upper end are illustrated. In the example in FIG. 5, downward shortest paths starting from start points that are all the pixels in the upper end and reaching end points that are pixels in the lower end are illustrated. As may be seen from the figures, paths converge. Since the number of end points is smaller than the number of start points, plural paths having different start points have the same end point.

Figure 6:
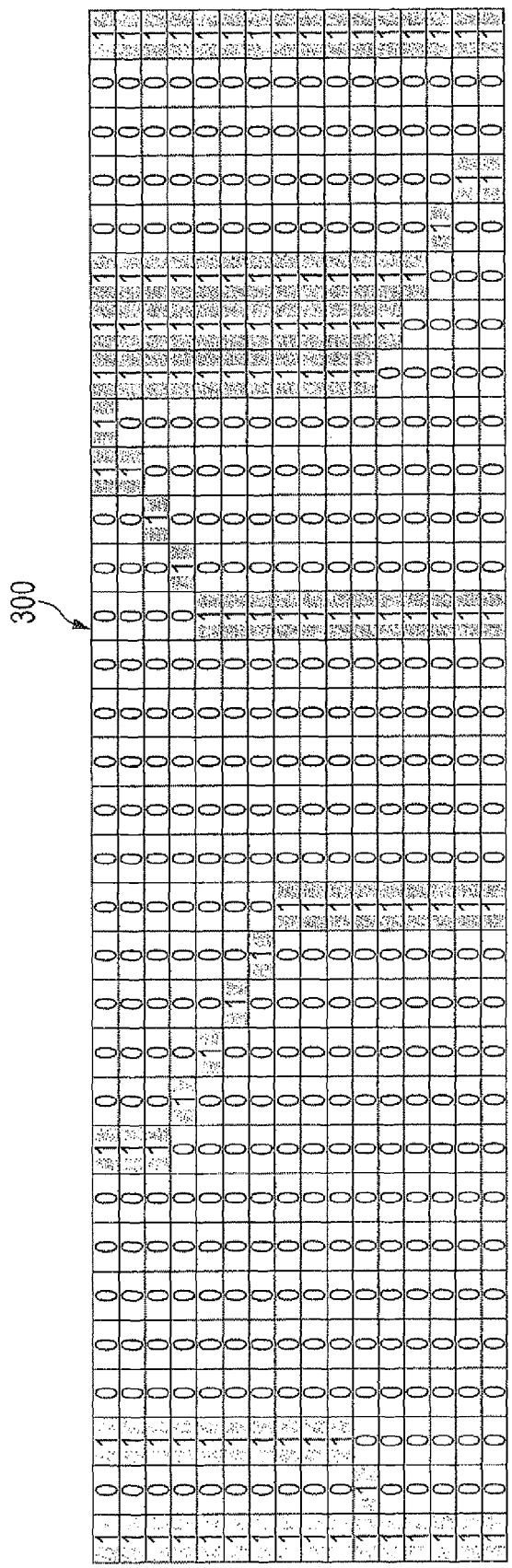
FIG. 6 illustrates an example of a shortest path obtained by a single iteration.

Here, when all the end points in the example in FIG. 4 are used as start points, a process for calculating a downward shortest path is performed. FIG. 6 illustrates an example of the process result. As above, the operation of calculating a path using the end point or end points of all the paths in one direction as a start point or start points in the other direction (the operation will be hereinafter referred to as an "iteration") further promotes convergence of paths. In other words, FIG. 6 illustrates an example of shortest paths obtained by one iteration (upward calculation and downward calculation).

Figure 7:
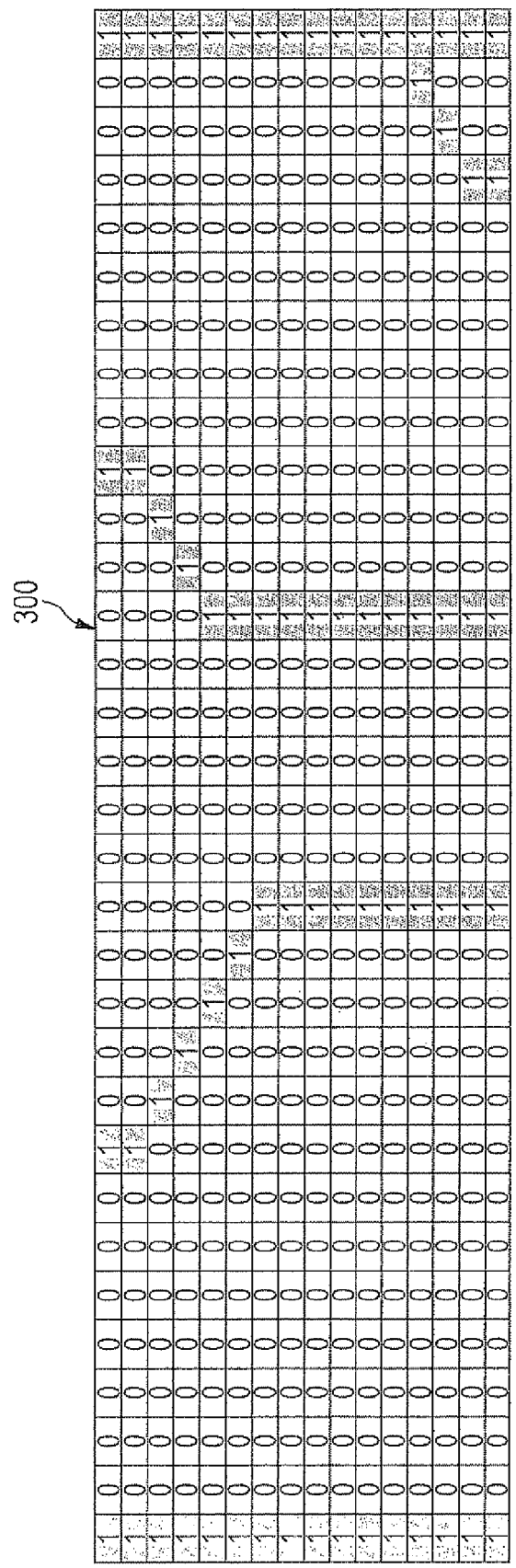
FIG. 7 illustrates an example of a shortest path obtained by two iterations.
Figure 8:
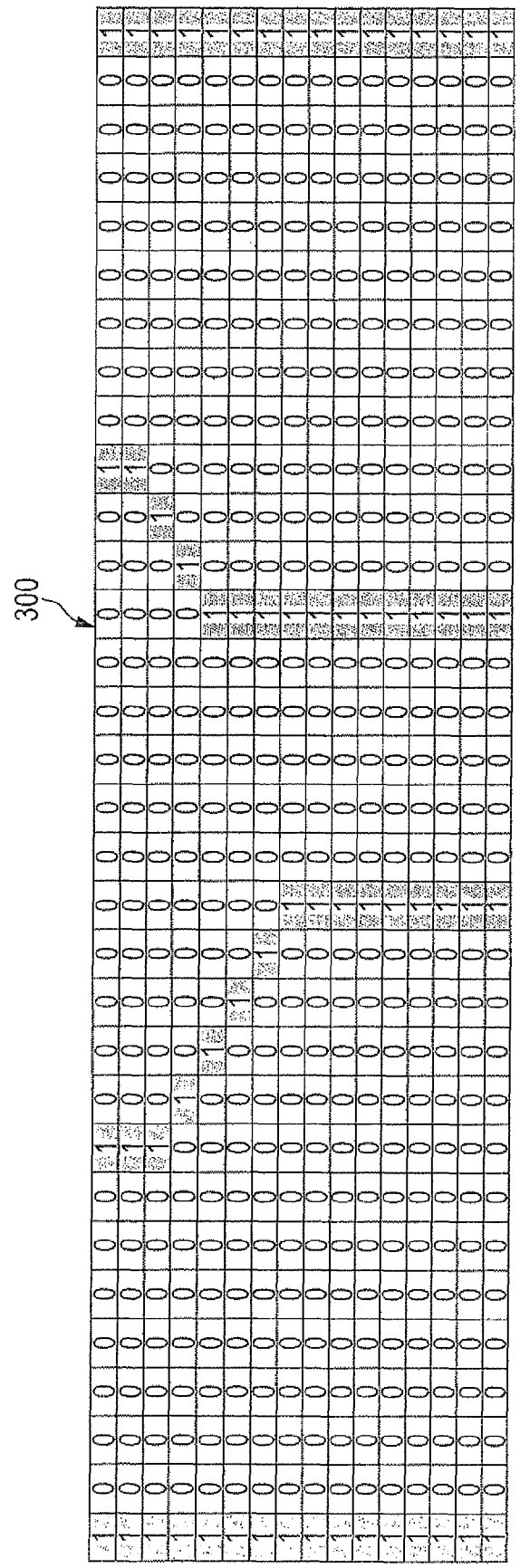
FIG. 8 illustrates an example of a shortest path obtained by three iterations.
Figure 9:
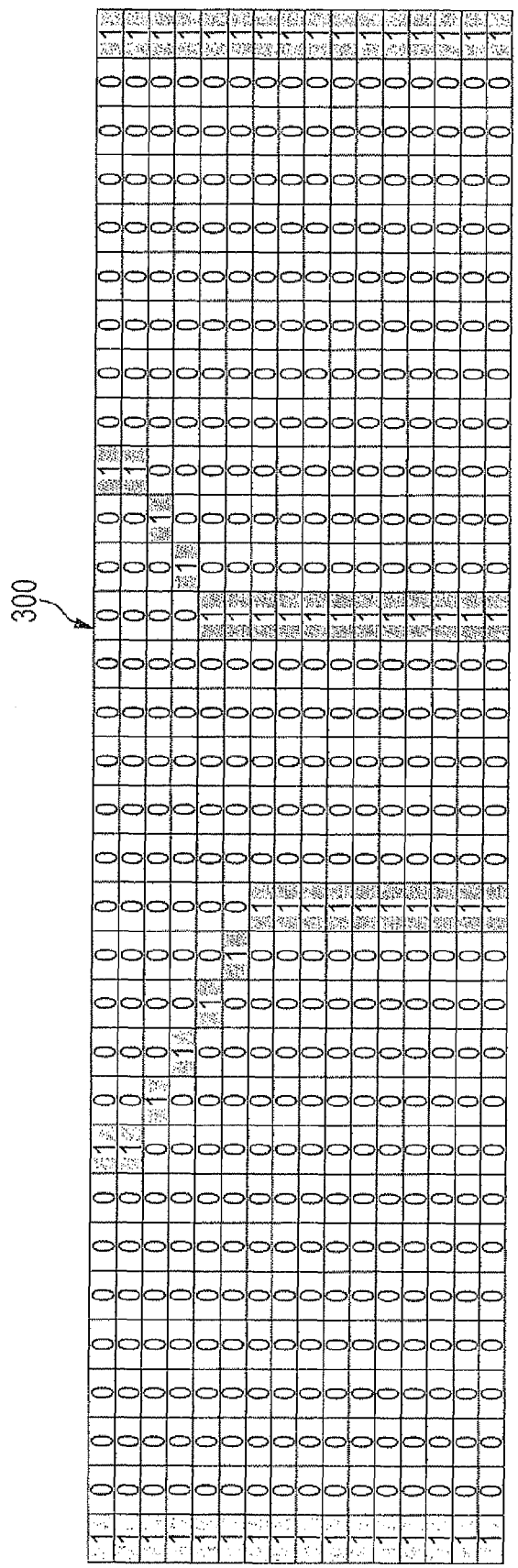
FIG. 9 illustrates an example of a shortest path obtained as a result of convergence.

FIG. 7 illustrates an example of shortest paths obtained by two iterations, FIG. 8 illustrates an example of shortest paths obtained by three iterations, and FIG. 9 illustrates an example of shortest paths obtained when further iteration would not yield any change of the start point or end point of a path, where each iteration starts in the upward direction. The state where further iteration would not yield any change of the start point or end point of a path may be a state where upward paths match downward paths, and the term "matching of paths" refers to matching of paths regardless of their directions. That is, a start point in one direction becomes an end point in the other direction, and an end point in one direction becomes a start point in the other direction.

Figure 10:
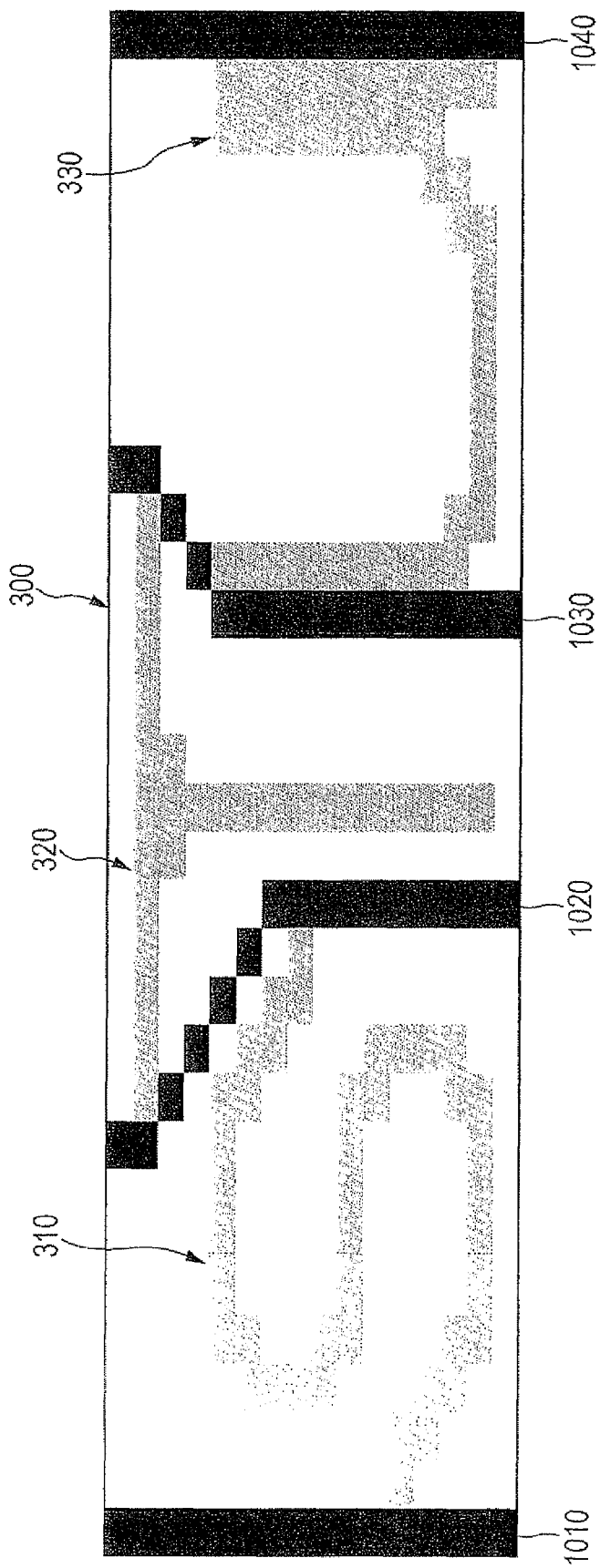
FIG. 10 illustrates an example of areas separated from the image by shortest paths.

FIG. 10 schematically illustrates an example of separation of the image 300 illustrated by way of example in FIG. 3 using the shortest paths illustrated by way of example in FIG. 9 as separation paths. As may be seen from FIG. 10, the image 300 is separated into the areas of the character image 310 (character "S"), the character image 320 (character "T"), and the character image 330 (character "U") by separation paths 1010, 1020, 1030, and 1040.

Therefore, this exemplary embodiment allows possible separation paths to be narrowed down on the basis of the convergence of paths.

In this exemplary embodiment, by using a start-point/end-point pair of a path, the iterative processes may eliminate the need for storing positions or the like of intermediate pixels between the start point and the end point of the path, and may reduce the amount of data to be processed. Furthermore, complete convergence to a path, as illustrated in the example in FIG. 9, may be calculated using only a start-point/end-point pair of the path even without using the positions or the like of the intermediate pixels.

In the calculation of a path for which the number of iterations is specified (that is, calculation that does not necessarily result in complete convergence), the number of separation paths is a monotonically decreasing function of the number of iterations, and, in this exemplary embodiment, the degree of separation may be adjusted in accordance with a request.

Various examples of exemplary embodiments of the present invention will be described hereinafter with reference to the drawings.

<Example Basic Configuration of this Exemplary Embodiment>

Figure 11:
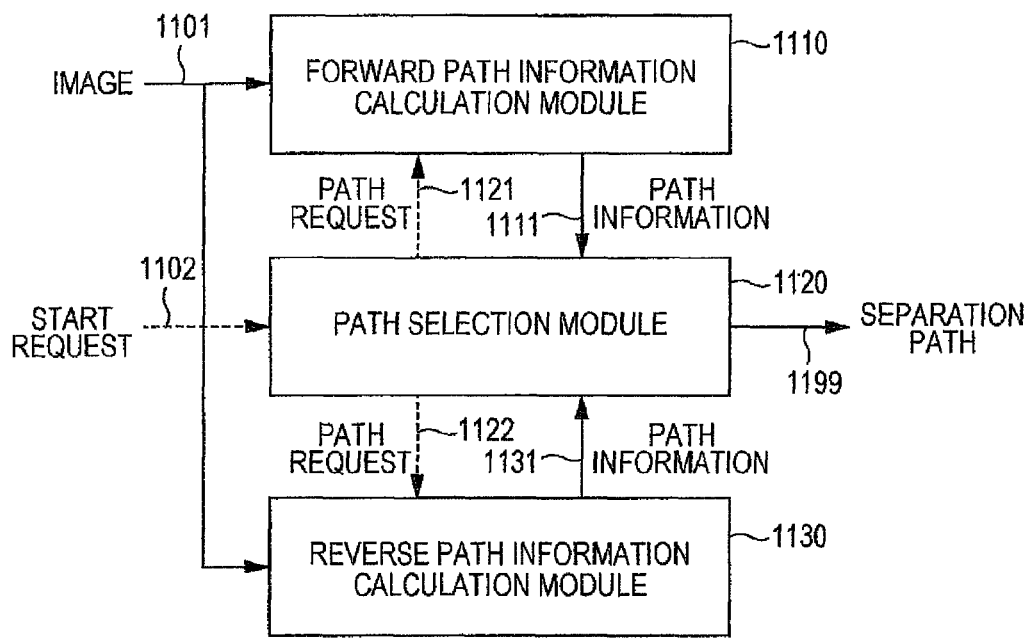
FIG. 11 is a conceptual module configuration diagram illustrating an example basic configuration of an exemplary embodiment.

FIG. 11 is a conceptual module configuration diagram illustrating an example basic configuration of (a path extraction apparatus which may be an example of an image processing apparatus according to) this exemplary embodiment. In the illustrated example basic configuration, the following processes may be performed:

(1) Path information calculation process: a process for, upon receipt of a path request, analyzing a target image and calculating path information. This process has the following two types:

(a) calculation of forward path information (a process performed by a forward path information calculation module 1130)

(b) calculation of reverse path information (a process performed by a reverse path information calculation module 1130)

(2) Path selection (a process performed by a path selection module 1120): a process for referring to path information and selecting a path on the basis of the convergence of paths.

(1) The path information calculation process is performed by the forward path information calculation module 1110 and the reverse path information calculation module 1130. The forward path information calculation module 1110 and the reverse path information calculation module 1130 are connected to the path selection module 1120, and perform a process for analyzing an image 1101 and calculating information on the shortest paths described above (path information 1111, path information 1131). The term "forward", as used herein, means the direction of a path of output, and the term "reverse", as used herein, means the direction opposite to the forward direction. For example, for the paths illustrated in the example in FIG. 9, the upward direction is the forward direction and the downward direction is the reverse direction.

(2) Path selection is performed by the path selection module 1120. The path selection module 1120 is connected to the forward path information calculation module 1110 and the reverse path information calculation module 1130, and obtains forward and reverse path information (path information 1111, path information 1131) output from the forward path information calculation module 1110 and the reverse path information calculation module 1130, respectively. Further, for the obtained path information, the path selection module 1120 selects a path using the convergence of paths, and outputs a separation path 1199.

In the example of FIG. 11, information items indicated by broken lines (a start request 1102, a path request 1121, and a path request 1122) represent processes that may not necessarily occur. Specifically, a start request may be information specifying the number of iterations of path selection, an initial direction, and an initial start point. A path request may be information specifying a start point of a path for which the forward path information calculation module 1110 and the reverse path information calculation module 1130 calculate path information.

The term "module" generally refers to a logically separable part of software (computer program), hardware, or the like. Therefore, the term "module" as used in this exemplary embodiment refers to not only a module in a computer program but also a module in a hardware configuration. Thus, this exemplary embodiment will be described in the context of a computer program, a system, and a method. While "storing", "being stored", and equivalent terms are used for convenience of description, such terms indicate, when the exemplary embodiment relates to a computer program, storing of the computer program in a storage device or performing of control to store the computer program in a storage device. Furthermore, modules and functions may have a one-to-one correspondence. In terms of implementation, one module may be composed of one program, plural modules may be composed of one program, or, conversely, one module may be composed of plural programs. Additionally, plural modules may be executed by a single computer, or a single module may be executed by plural computers in a distributed or parallel environment. One module may include another module. Further, hereinafter, the term "connection" includes physical connection and logical connection (such as exchanging data, issuing an instruction, and cross-reference between data items).

Furthermore, the term "system or apparatus" includes a configuration in which plural computers, hardware components, devices, or other suitable elements are connected to one another via a communication medium such as a network (including a one-to-one communication connection), and what is implemented by a single computer, hardware component, device, or suitable element. The terms "apparatus" and "system" are used as synonymously. It is to be understood that the term "system" does not include what is merely a social "mechanism" (social system) based on artificial rules. The term "predetermined" means "determined before" the performance of a desired process, and may include "determined before" the start of a process according to the exemplary embodiment, and "determined before" the performance of a desired process even after the start of a process according to the exemplary embodiment, in accordance with the current state and condition or in accordance with the previous state and condition.

Moreover, desired information is read from a storage device for each process performed by an individual module or, if plural processes are performed within a module, for each of the plural processes, and is processed. The process result is written in the storage device. Therefore, reading information from the storage device before processing the information and writing information to the storage device after processing the information may not necessarily be described herein. The term "storage device", as used herein, may include a hard disk, a random access memory (RAM), an external storage medium, a storage device using a communication line, and a register in a central processing unit (CPU).

Additionally, a target image will be described in the context of an image including multiple characters written in one horizontal row, by way of example.

<Classification of Examples of Exemplary Embodiment>

In the following description, examples of the exemplary embodiment are classified in accordance with the following items:

(1) Number of iterations (2) Timing of calculation of path information (3) Information to be narrowed down (4) Adjustment of narrowed-down items The examples of the exemplary embodiment are classified in a manner as given in Table 1 by way of example.

TABLE 1

| Number of iterations | Timing of calculation of path information | Information to be narrowed down | Adjustment of narrowed-down items | Example |
|---|---|---|---|---|
| Single | — | — | — | First example |
| Plural | Collective pre-calculation | Paths | Specified number of iterations | Second example |
|  |  |  | Complete convergence | Second example |
|  |  | Start points | Specified number of iterations | Third example |
|  |  |  | Complete convergence | Third example |
|  | Sequential calculation | Paths | Specified number of iterations | Fourth example |
|  |  | Start points | Specified number of iterations | Fifth example |

(1) "Number of iterations" represents classification based on the number of times iteration is to be performed, as described above. The number of separation paths is a monotonically decreasing function of the number of times iteration is to be performed. A first example of the exemplary embodiment provides one iteration (one forward calculation and one reverse calculation), and the other examples of the exemplary embodiment provide plural iterations.

(2) "Timing of calculation of path information" represents classification based on whether the calculation of path information is performed by calculating all the pieces of path information in advance (hereinafter referred to as "collective pre-calculation") or sequentially calculating required path information (hereinafter referred to as "sequential calculation"). This classification relates to the tradeoff between the work memory capacity and the processing time. A second example and a third example of the exemplary embodiment provide collective pre-calculation, and a fourth example and a fifth example of the exemplary embodiment provide sequential calculation.

(3) "Information to be narrowed down" represents classification based on whether a narrow-down process using shortest path convergence is performed by referring to the paths themselves (the positions of start points, the positions of end points, and the positions of intermediate pixels therebetween along the paths) or start points (or start-point/end-point pairs). In implementations, the latter is generally selected in view of the work memory capacity and the processing time. The second example and the fourth example provide the reference to the paths themselves, and the third example and the fifth example provide the reference to start points.

(4) "Adjustment of narrowed-down items" represents classification based on whether a result of a narrow-down process with a predetermined number of iterations is determined as a separation path or a result of complete convergence is determined as a separation path. Different processes are performed depending on the determination result. Further, for collective pre-calculation of path information (second example, third example), an example in which a result of complete convergence is determined as a separation path is given. In some examples of the exemplary embodiment, sequential calculation may yield a result of complete convergence. However, in these examples of the exemplary embodiment, termination conditions are set using the number of iterations at infinity, which may be equivalent to the case in which the number of iterations is specified. Thus, such examples are not discussed herein.

First Example

Figure 12:
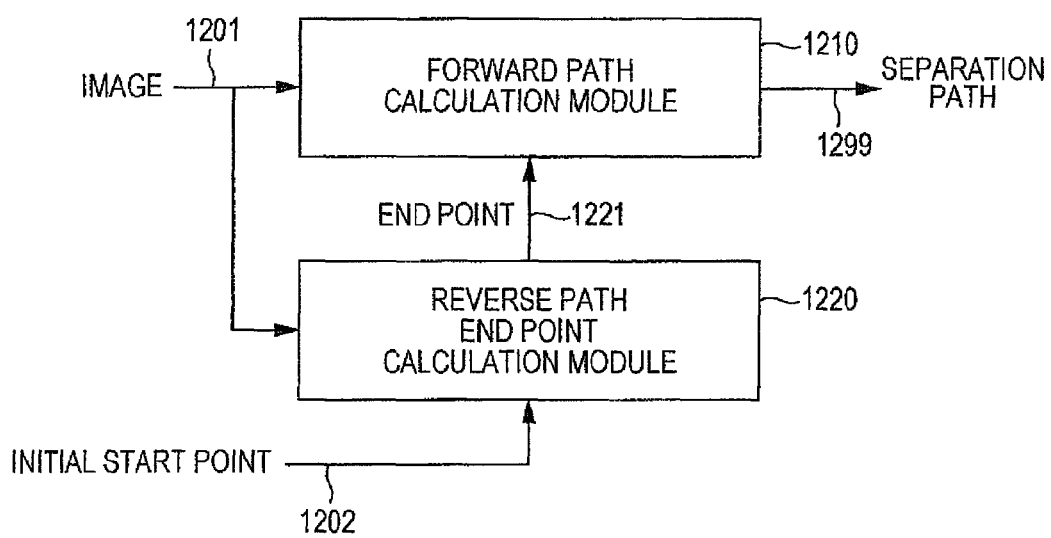
FIG. 12 is a conceptual module configuration diagram illustrating an example configuration of a first example of the exemplary embodiment.

FIG. 12 is a conceptual module configuration diagram illustrating an example configuration of the first example of the exemplary embodiment. The example configuration of the first example is designed to narrow down paths by a single iteration, by way of example, and includes a forward path calculation module 1210 and a reverse path end point calculation module 1220. The forward path calculation module 1210 and the reverse path end point calculation module 1220 are connected to each other.

In the first example, the following process is performed:
<<Step 1>>

The reverse path end point calculation module 1220 receives an image 1201 and an initial start point 1202, and analyzes the image 1201 to calculate a shortest path end point 1221 corresponding to the initial start point 1202. The reverse path end point calculation module 1220 outputs the end point 1221 to the forward path calculation module 1210.
<<Step 2>>

The forward path calculation module 1210 analyzes the image 1201, uses the received end point 1221 as a start point, calculate a separation path 1299 corresponding to the start point, and outputs the separation path 1299. Then, the process ends.

The forward path calculation module 1210 also takes the role of the path selection module 1120 in the example illustrated in FIG. 11.

Second Example

The second example and the subsequent examples of the exemplary embodiment are configured to narrow down paths by plural iterations.

Figure 13:
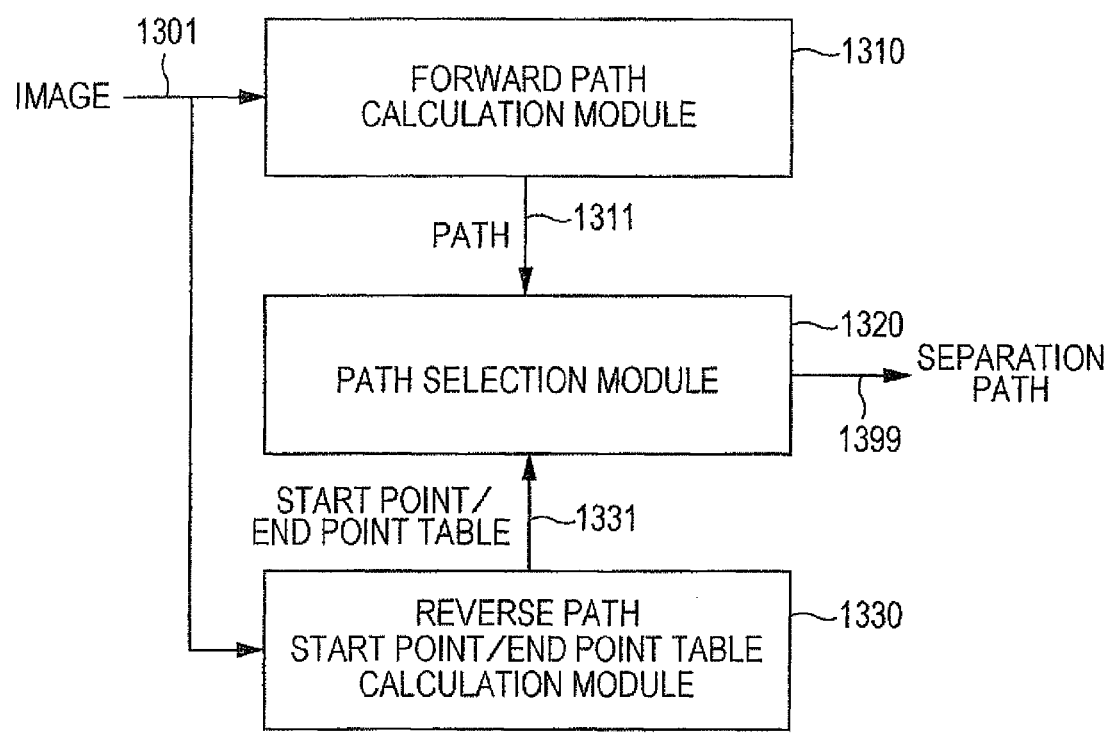
FIG. 13 is a conceptual module configuration diagram illustrating an example configuration of a second example of the exemplary embodiment.

FIG. 13 is a conceptual module configuration diagram illustrating an example configuration of the second example. The example configuration of the second example is designed to collectively pre-calculate pieces of path information and to narrow down the pieces of path information, and includes a forward path calculation module 1310, a path selection module 1320, and a reverse path start point/end point table calculation module 1330. A description will be given of a case of, in particular, collectively pre-calculating all the paths and narrowing down the paths. The term "all the paths" means all possible paths starting from, as start points, all the pixels in the upper or lower end of the target image.

Further, the second example and the third example are designed to calculate path information only once first time, and may therefore be used for the reduction of the processing time.

In the second example, the following process is performed:
<<Step 1>>

The reverse path start point/end point table calculation module 1330 is connected to the path selection module 1320, and analyzes an image 1301 to calculate a start point/end point table 1331. The reverse path start point/end point table calculation module 1330 outputs the start point/end point table 1331 to the path selection module 1320.

The forward path calculation module 1310 is connected to the path selection module 1320, and analyzes the image 1301 to calculate paths 1311 starting from all the start points. The forward path calculation module 1310 outputs the paths 1311 to the path selection module 1320.

<<Step 2>>

The path selection module 1320 is connected to the forward path calculation module 1310 and the reverse path start point/end point table calculation module 1330, and narrows down the paths on the basis of the forward paths 1311 and the reverse start point/end point table 1331. The path selection module 1320 outputs a resulting path as a separation path 1399. Then, the process ends.

The start point/end point table will be described below.

Third Example

Figure 14:
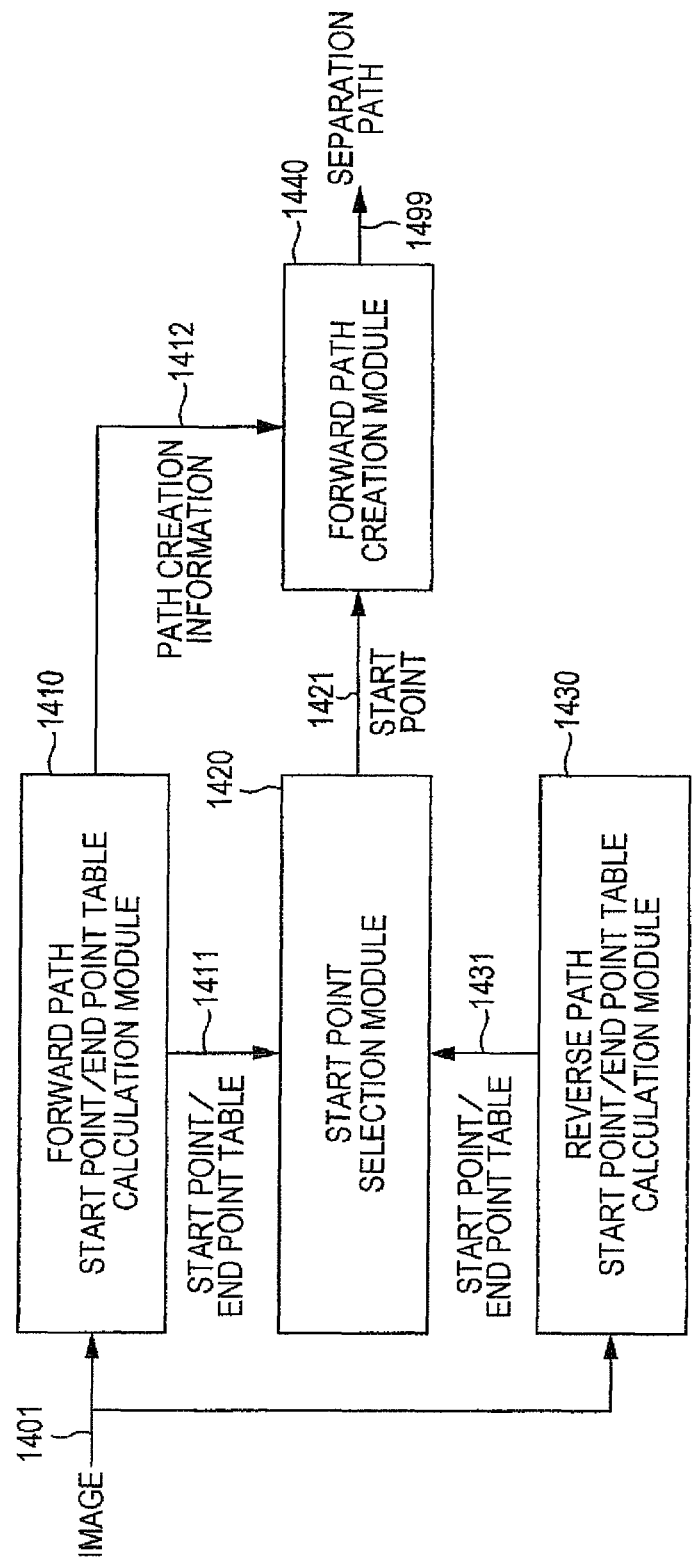
FIG. 14 is a conceptual module configuration diagram illustrating an example configuration of a third example of the exemplary embodiment.

FIG. 14 is a conceptual module configuration diagram illustrating an example configuration of the third example of the exemplary embodiment. The example configuration of the third example is designed to calculate only a start point/end point table and path creation information, narrow down start points, and then calculate a path, and includes a forward path start point/end point table calculation module 1410, a start point selection module 1420, a reverse path start point/end point table calculation module 1430, and a forward path creation module 1440.

In the third example, the following process is performed:

<<Step 1>>

The reverse path start point/end point table calculation module 1430 is connected to the start point selection module 1420, and analyzes an image 1401 to calculate a start point/end point table 1431. The reverse path start point/end point table calculation module 1430 outputs the start point/end point table 1431 to the start point selection module 1420.

The forward path start point/end point table calculation module 1410 is connected to the start point selection module 1420 and the forward path creation module 1440, and analyzes the image 1401 to calculate a start point/end point table 1411. The forward path start point/end point table calculation module 1410 outputs the start point/end point table 1411 to the start point selection module 1420. The forward path start point/end point table calculation module 1410 further calculates path creation information 1412, and outputs the path creation information 1412 to the forward path creation module 1440.

<<Step 2>>

The start point selection module 1420 is connected to the forward path start point/end point table calculation module 1410, the reverse path start point/end point table calculation module 1430, and the forward path creation module 1440, and narrows down start points 1421 of paths on the basis of the forward path start point/end point table 1411 and the reverse path start point/end point table 1431. The start point selection module 1420 outputs a resulting start point to the forward path creation module 1440.

<<Step 3>>

The forward path creation module 1440 is connected to the forward path start point/end point table calculation module 1410 and the start point selection module 1420, and creates a path starting from the start point 1421 received from the start point selection module 1420 on the basis of the path creation information 1412 received from the forward path start point/end point table calculation module 1410. The forward path creation module 1440 outputs the created path as a separation path 1499.

Here, a start point/end point table will be described.

A start point/end point table is information that holds start-point/end-point pairs of paths. In a path narrow-down process according to the second example (FIG. 13) and the third example (FIG. 14), information regarding a start-point/end-point pair of a path may be used. This process will be described hereinafter.

Now, let a forward start point/end point table be given by Expression (1).

$$T=(e_0, e_1, \ldots, e_{w-1}) \quad (1)$$

Further, a reverse start point/end point table is represented by T'. Expression (2) defines the position of an end point of a path starting from a start point at a position x.

$$T(x)=e_x \quad (2)$$

A start point/end point table is an array of start-point/end-point pairs of paths starting from all the start points. In the expressions, w denotes the lateral width (width in the character string direction) of the target image.

It is noted that the path selection module 1320 according to the second example (FIG. 13) calculates T from the received paths 1311 and performs the subsequent process in a similar way.

Let a certain path be given by Expression (3).

$$p=(x_0, x_1, \ldots, x_{h-1}) \quad (3)$$

Let the position of the path at a height y be given by Expression (4).

$$p(y)=x_y \quad (4)$$

For example, a start point and an end point of an upward path is given by Expressions (5) and (6), respectively:

$$p(0)=x_0 \quad (5)$$

$$p(h-1)=x_{h-1} \quad (6)$$

where h denotes the longitudinal width (width in the direction perpendicular to the character string direction) of the target image. When the forward direction is the upward direction, the set of paths 1311 received by the path selection module 1320 is given by Expression (7), and Expression (9) is applied for all the paths p given by Expression (8) to calculate T from the received paths 1311.

$$P=\{p_0, p_1, \ldots, p_{w-1}\} \quad (7)$$

$$p \in P \quad (8)$$

$$T(p(0)) \leftarrow p(h-1) \quad (9)$$

If the forward direction is the downward direction, Expression (10) is applied.

$$T(p(h-1)) \leftarrow p(0) \quad (10)$$

Further, the direction (called an initial direction) of a start point/end point table to be referred to first is defined in accordance with the forward direction that is the direction of a path of output and the number of iterations. Specifically, if the number of iterations is an odd number, the initial direction is the reverse direction, and if the number of iterations is an even number, the initial direction is the forward direction.

A path narrow-down process differs between the narrow-down of paths based on a specified number of iterations and narrow-down of paths based on complete convergence. The individual processes will be described hereinafter.

First, a narrow-down process of paths (start points) based on a specified number of iterations is performed according to the following conditions (11):

step 1: Let the number of iterations be R.

If R is an even number, then set $T_{tmp} \leftarrow T$.

Otherwise, set $T_{tmp} \leftarrow T'$.

step 2: Let a set of start points be $S$.

Set $S_{tmp} \leftarrow \{T_{tmp}(x)|x \in S\}$.

Set $S \leftarrow S_{tmp}$.

step 3: if $R=1$, then, output $S$ and end the process.

Otherwise, set $R \leftarrow R-1$.

step 4: If $T_{tmp}=T'$, then, set $T_{tmp} \leftarrow T$.

Otherwise, then set $T_{tmp} \leftarrow T'$.

Return to step 2. (11)

Next, a narrow-down process of paths (start points) based on complete convergence is performed according to the following conditions (12).

step 1: Let a set of start points be $S$.

For $x=[0, w-1]$, set $S \leftarrow \{x|T(T'(x))=x\}$.

Output $S$, and end the process. (12)

A set S of start points is obtained in the above way. It is noted that the path selection module 1320 according to the second example (FIG. 13) outputs P' given by Expression (13) after the processing of Conditions (12).

$$P' \leftarrow \{p|p(y)=s, p \in P, s \in S\} \quad (13)$$

If the forward direction is the upward direction, y=0 is determined, and if the forward direction is the downward direction, y=h−1 is determined.

The expression in the third row of Conditions (12) indicates that if an end point (B) corresponding to a start point (A) in a certain direction is set as a start point (B) in the opposite direction, an end point of a resulting path is the point (A).

Fourth Example

Figure 15:
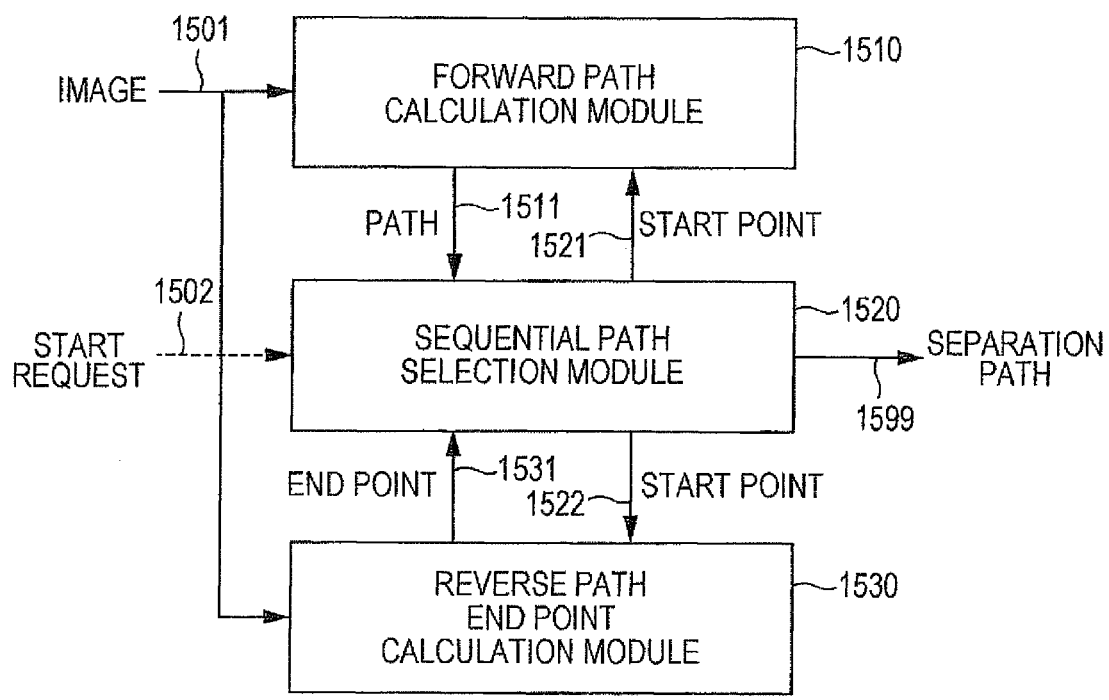
FIG. 15 is a conceptual module configuration diagram illustrating an example configuration of a fourth example of the exemplary embodiment.

The fourth example (FIG. 15) and the fifth example (FIG. 16) of the exemplary embodiment have a configuration for narrowing down paths by plural iterations, namely, a configuration for sequentially calculating required path information. The configuration of the fourth example is designed to sequentially calculate paths, and the configuration of the fifth example is designed to sequentially calculate start points and finally calculate a path.

The configurations illustrated in the fourth example and the fifth example are designed to sequentially compute required path information, and may therefore be used for the reduction of the work memory capacity.

The configuration of the fourth example includes a forward path calculation module 1510, a sequential path selection module 1520, and a reverse path end point calculation module 1530.

A start request (1502 in the example in FIG. 15, 1602 in the example in FIG. 16) is a set of initial start points.

In the fourth example, the following process is performed:
<<Step 1>>

Let the number of iterations be R.

The sequential path selection module 1520 is connected to the forward path calculation module 1510 and the reverse path end point calculation module 1530, and performs the following process:

If R is an even number, the sequential path selection module 1520 outputs a start point 1521 to the forward path calculation module 1510. Then, the process proceeds to step 2.

Otherwise, R←R−1 is set, and the sequential path selection module 1520 outputs a start point 1522 to the reverse path end point calculation module 1530. Then, the process proceeds to step 4.
<<Step 2>>

The forward path calculation module 1510 is connected to the sequential path selection module 1520, and analyzes an image 1501 to calculate paths 1511 starting from all received start points 1521. The forward path calculation module 1510 outputs the paths 1511 to the sequential path selection module 1520.
<<Step 3>>

If R=0 is set, the sequential path selection module 1520 outputs a received path 1511 as a separation path 1599. Then, the process ends.

Otherwise, R←R−2 is set, and the sequential path selection module 1520 sets a start point of a received path 1511 as an end point, and outputs a start point 1522 to the reverse path end point calculation module 1530.
<<Step 4>>

The reverse path end point calculation module 1530 is connected to the sequential path selection module 1520, and analyzes the image 1501 to calculate end points 1531 of the paths starting from all received start points 1522. The reverse path end point calculation module 1530 outputs the end points 1531 to the sequential path selection module 1520.
<<Step 5>>

The sequential path selection module 1520 sets the received end points 1531 as start points, and outputs the start point 1521 to the forward path calculation module 1510. Then, the process proceeds to step 2.

Fifth Example

Figure 16:
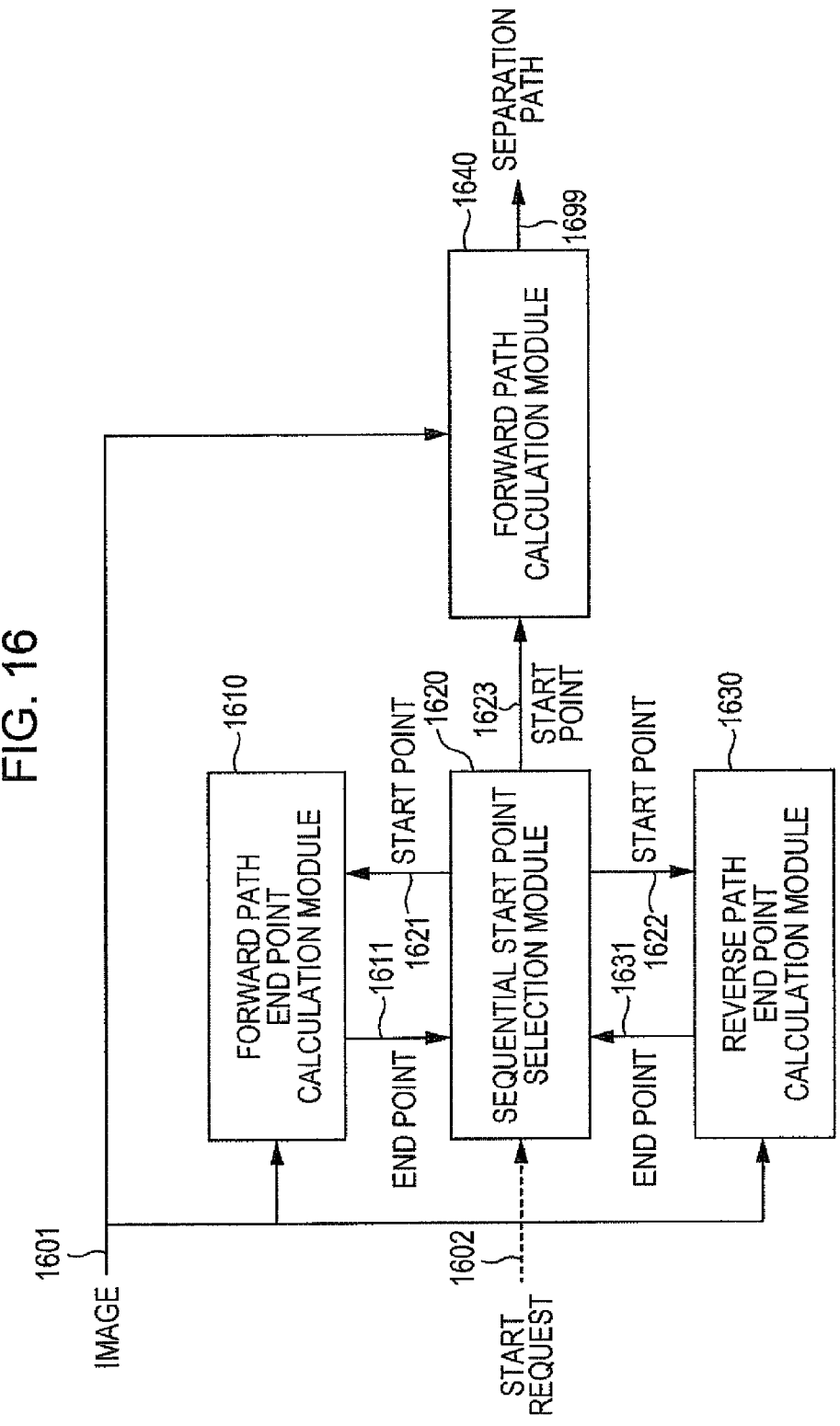
FIG. 16 is a conceptual module configuration diagram illustrating an example configuration of a fifth example of the exemplary embodiment.

FIG. 16 is a conceptual module configuration diagram illustrating an example configuration of the fifth example of the exemplary embodiment. The example configuration of the fifth example includes a forward path end point calculation module 1610, a sequential start point selection module 1620, a reverse path end point calculation module 1630, and a forward path calculation module 1640.

In the fifth example, the following process is performed:
<<Step 1>>

Let the number of iterations be R.

The sequential start point selection module 1620 is connected to the forward path end point calculation module 1610, the reverse path end point calculation module 1630, and the forward path calculation module 1640, and performs the following process:

If R is an even number, the sequential start point selection module 1620 outputs a start point 1621 to the forward path end point calculation module 1610. Then, the process proceeds to step 2.

Otherwise, R←R−1 is set, and the sequential start point selection module 1620 outputs a start point 1622 to the reverse path end point calculation module 1630. Then, the process proceeds to step 4.
<<Step 2>>

The forward path end point calculation module 1610 is connected to the sequential start point selection module 1620, and analyzes an image 1601 to calculate end points 1611 of paths starting from all received start points 1621. The forward path end point calculation module 1610 outputs the end points 1611 to the sequential start point selection module 1620.

<<Step 3>>

If R=0 is obtained, the sequential start point selection module 1620 outputs the received end points 1611 to the forward path calculation module 1640 as start points 1623. Then, the process proceeds to step 6.

Otherwise, R←R−2 is set, and the sequential start point selection module 1620 sets an end point 1611 of a received path as a start point, and outputs a start point 1622 to the reverse path end point calculation module 1630.

<<Step 4>>

The reverse path end point calculation module 1630 is connected to the sequential start point selection module 1620, and analyzes the image 1601 to calculate end points 1631 of paths starting from all the received start points 1622. The reverse path end point calculation module 1630 outputs the end points 1631 to the sequential start point selection module 1620.

<<Step 5>>

The sequential start point selection module 1620 outputs the received end points 1631 to the forward path end point calculation module 1610 as start points 1621. Then, the process proceeds to step 2.

<<Step 6>>

The forward path calculation module 1640 is connected to the sequential start point selection module 1620, and creates paths starting from all received start points 1623. The forward path calculation module 1640 outputs the paths as separation paths 1699. Then, the process ends.

<Exemplary Embodiment for Outputting Sub-Image>

FIGS. 17, 18, 19, and 20 illustrate examples of configurations for separating an image using a separation path calculated according to the foregoing exemplary embodiment. The illustrated configurations may be configurations for separating single characters from a character string image and outputting the single characters as single character images. In FIGS. 17, 18, 19, and 20, each of path extraction modules 1720, 1830, 1930, and 2040 has the configuration of the first example (FIG. 12), the second example (FIG. 13), the third example (FIG. 14), the fourth example (FIG. 15), or the fifth example (FIG. 16). The output single character images may be processed by, for example, a character image recognition device or the like.

Figure 17:
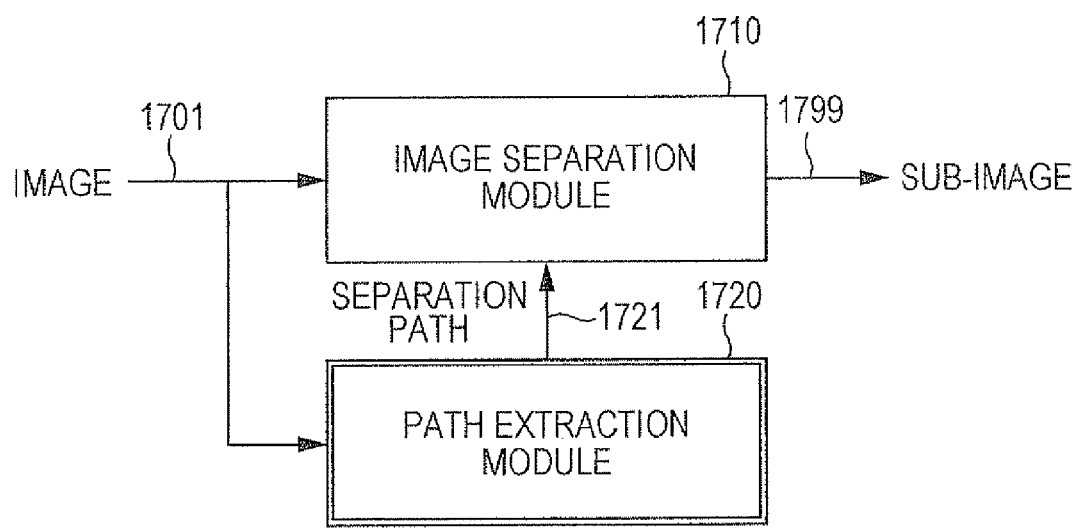
FIG. 17 is a conceptual module configuration diagram illustrating an example configuration of an image processing apparatus including a path extraction module.

FIG. 17 is a conceptual module configuration diagram illustrating an example configuration of an image processing apparatus including the path extraction module 1720. The image processing apparatus exemplary embodiment is configured to separate an image using a separation path and to output a sub-image, and includes an image separation module 1710 and the path extraction module 1720.

The image separation module 1710 is connected to the path extraction module 1720. The image separation module 1710 receives an image 1701 that may be a character string image, separates the image 1701 into areas of single character images in accordance with a separation path 1721 received from the path extraction module 1720, and outputs sub-images 1799.

Figure 18:
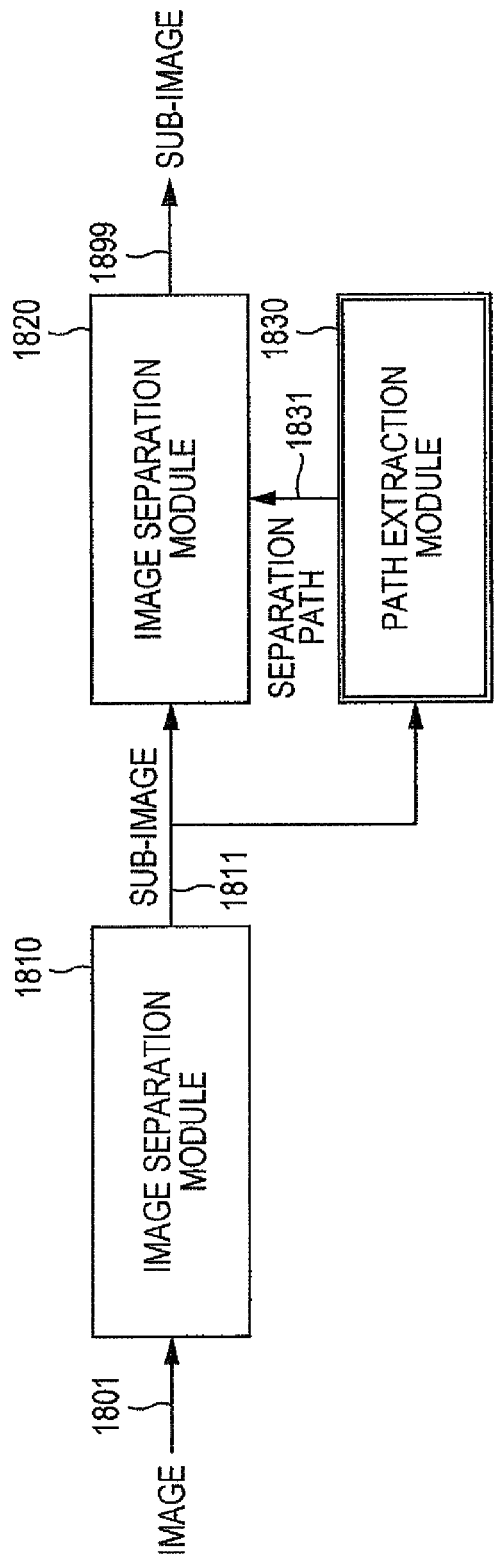
FIG. 18 is a conceptual module configuration diagram illustrating an example configuration of an image processing apparatus including a path extraction module.

FIG. 18 is a conceptual module configuration diagram illustrating an example configuration of an image processing apparatus including the path extraction module 1830. The image processing apparatus includes an image separation module 1810, an image separation module 1820, and the path extraction module 1830.

The image separation module 1810 is connected to the image separation module 1820 and the path extraction module 1830, and is configured to perform the extraction of a separation candidate areas as pre-processing of the path extraction module 1830. For example, the image separation module 1810 may extract only a character image as a sub-image 1811 from an image 1801. The image separation module 1810 further separates a single character image using a technique of the related art based on projection information or the like, and passes an inseparable area (sub-image 1811) to the path extraction module 1830.

The image separation module 1820 is connected to the image separation module 1810 and the path extraction module 1830. The image separation module 1820 separates the sub-image 1811 received from the image separation module 1810 into areas of single character images in accordance with a separation path 1831 received from the path extraction module 1830, and outputs sub-images 1899. If the image separation module 1810 also separates a single character image, a sub-image 1811 passed from the image separation module 1810 to the image separation module 1820 also includes a single character image of an area separated by the image separation module 1810 (an image not to be processed by the path extraction module 1830). The single character image is output as it is as a sub-image 1899.

Figure 19:
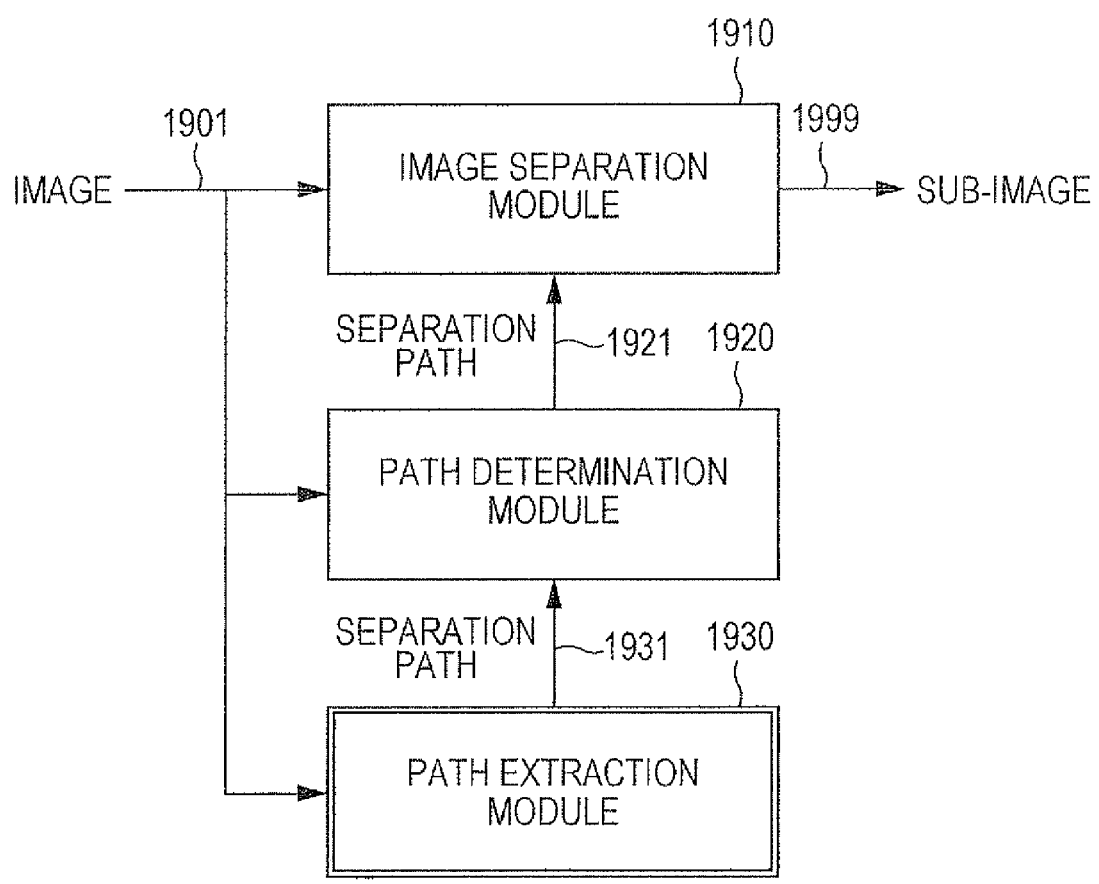
FIG. 19 is a conceptual module configuration diagram illustrating an example configuration of an image processing apparatus including a path extraction module.

FIG. 19 is a conceptual module configuration diagram illustrating an example configuration of an image processing apparatus including the path extraction module 1930. The image processing apparatus includes an image separation module 1910, a path determination module 1920, and the path extraction module 1930.

The path determination module 1920 is connected to the image separation module 1910 and the path extraction module 1930, and performs a process for determining whether or not accurate separation is achievable using a separation path 1931 output from the path extraction module 1930. This process allows discard of unsuitable separation paths such as separation paths that appear at smaller intervals than those of the other separation paths (for example, separation paths defining parts of which kanji characters are made up, such as radicals on the left side ("hen") and radicals on the right side ("tsukuri")). The determination of unsuitable paths may be performed using an image 1901.

The image separation module 1910 is connected to the path determination module 1920, and separates the image 1901 into areas of single character images in accordance with a separation path 1921 received from the path determination module 1920. The image separation module 1910 outputs the area as a sub-image 1999.

Figure 20:
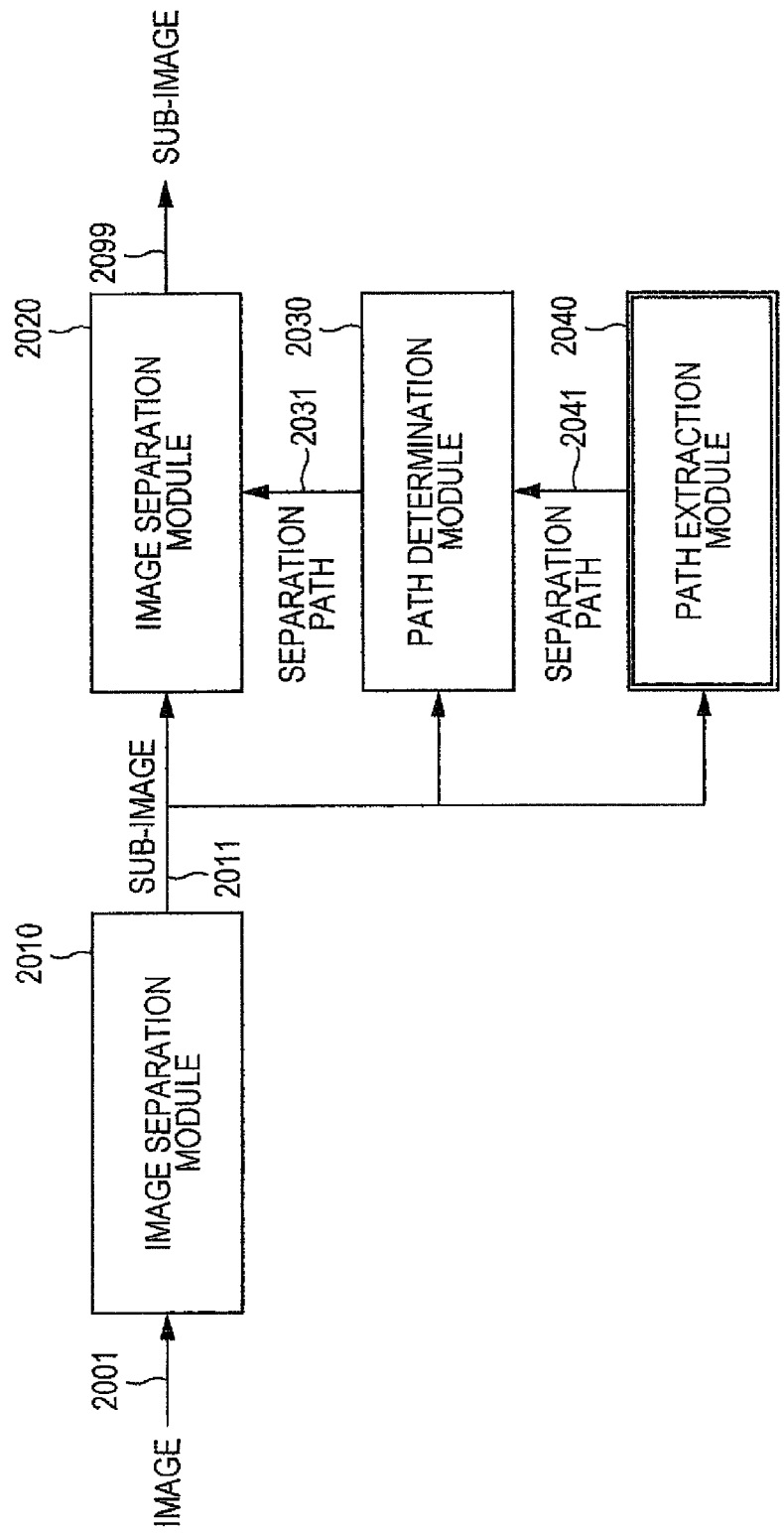
FIG. 20 is a conceptual module configuration diagram illustrating an example configuration of an image processing apparatus including a path extraction module.

FIG. 20 is a conceptual module configuration diagram illustrating an example configuration of an image processing apparatus including the path extraction module 2040. The image processing apparatus includes an image separation module 2010, an image separation module 2020, a path determination module 2030, and the path extraction module 2040. The image processing apparatus has a configuration in which the examples in FIGS. 18 and 19 are combined.

The image separation module 2010 is connected to the image separation module 2020, the path determination module 2030, and the path extraction module 2040, and performs a process substantially equivalent to that performed by the image separation module 1810 illustrated in the example in FIG. 18.

The path determination module 2030 is connected to the image separation module 2010, the image separation module 2020, and the path extraction module 2040, and performs a process substantially equivalent to that performed by the path determination module 1920 illustrated in the example in FIG. 19.

The image separation module 2020 is connected to the image separation module 2010 and the path determination module 2030, and performs a process substantially equivalent to that performed by the image separation module 1910 illustrated in the example in FIG. 19. However, the image separation module 2020 performs the process on a sub-image 2011 received from the image separation module 2010.

A specific example of the path calculation process according to the foregoing exemplary embodiment (for example, the process performed by the forward path calculation module 1210 and the reverse path end point calculation module 1220 according to the first example (FIG. 12), and the like) will be described hereinafter.

An example for the calculation of the shortest path illustrated in the example in FIG. 1 by simultaneity calculating plural pieces of shortest path information having different start points will be described using a shortest path illustrated in an example in FIG. 21. Examples of shortest path calculation methods include Dijkstra's algorithm.

The shortest path illustrated in the example in FIG. 21 will now be described.

A tree structure in which a certain pixel is a parent and three pixels, that is, an pixel adjacent to the parent pixel in the end point direction (in FIG. 21, in the upward direction) and pixels located obliquely at 45 degrees to the end point direction, is used. This structure repeats, and, as illustrated in the example in FIG. 21, a tree whose root is a certain pixel (start point 2111) at an end of an image 2100 and whose leaf is a pixel (such as an end point 2121) in the other end, where the tree height is equal to the image height, is extracted.

In this exemplary embodiment, the term "shortest path" means a path with minimum or maximum cost in the above tree, where cost is a cumulative value of the luminance values of pixels (that is, nodes) along a path among all the paths directed from the root to the leaf. The root is the start point, and the leaf is the end point.

Figure 22:
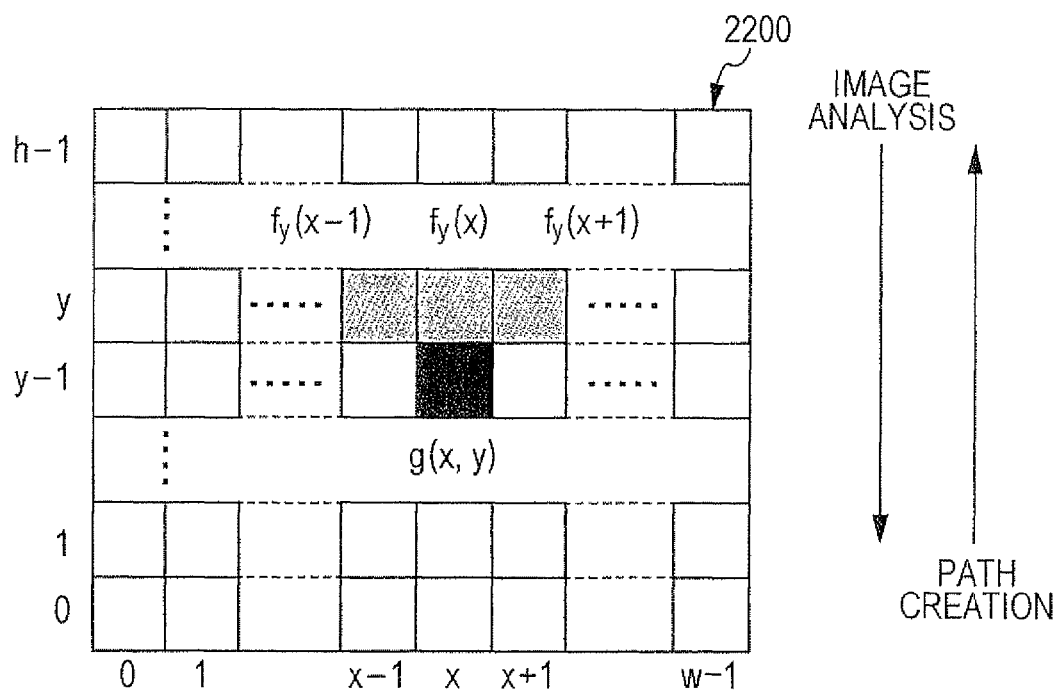
FIG. 22 illustrates an example of the calculation of path information.

First, an example of a basic process for calculating a shortest path is given in an algorithm defined by Conditions (14). Further, for the purpose of reference, an example of the position relationship between pixels to be processed is illustrated in FIG. 22.

Figure 21:
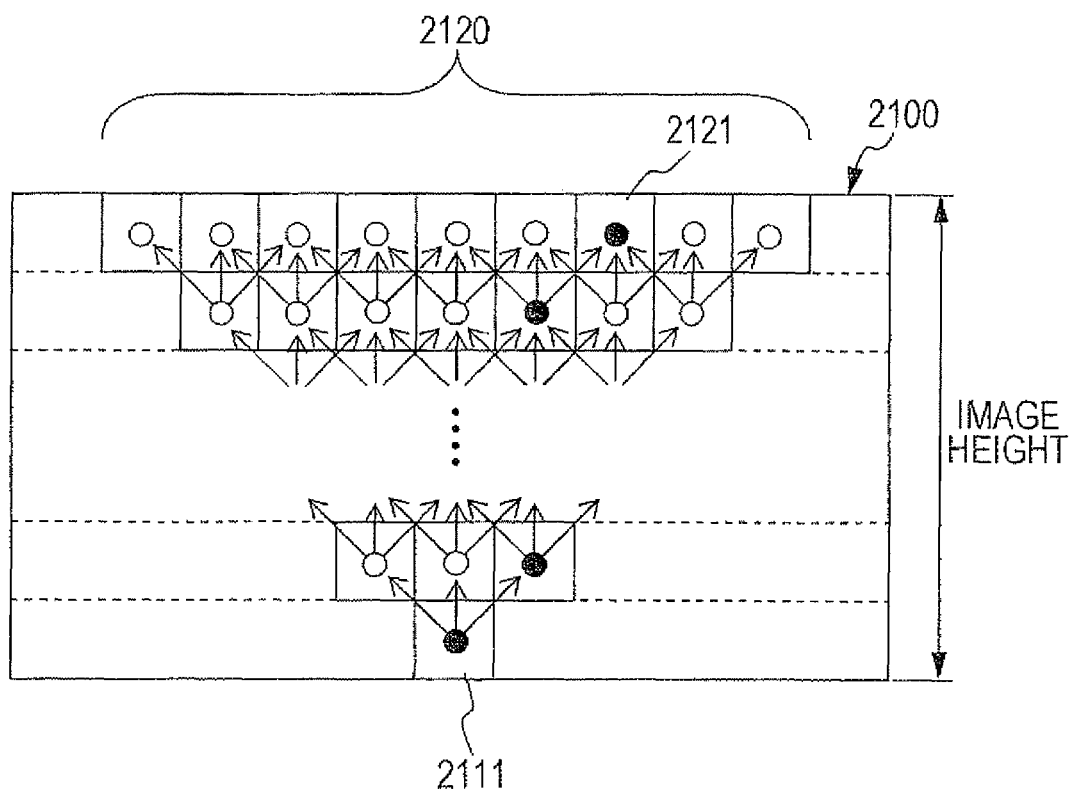
FIG. 21 illustrates an example of the calculation of path information.

This example uses a backward induction process, which is a method for searching for a shortest path in the tree illustrated in the example in FIG. 21. The path cost is related to every node rather than every edge. It is to be noted that the order of the process in the "step 2. Image analysis" for individual positions on an image is opposite to that in "step 3. Path creation". The process is a process for calculating an upward shortest path, and it is to be understood that this process may be applied to the calculation of a downward shortest path or a shortest path in any other direction.

This process corresponds to "forward path calculation". Further, the operation of step 3 and the following operations correspond to "forward path creation".

step 1. Initialization

For $x=[0,w-1]$, set $f_{h-1}(x) \leftarrow g(x,h-1)$.

step 2. Image Analysis step 2-1. Set $y \leftarrow h-1$.

step 2-2. For $x=[0,w-1]$, set $f_{y-1}(x) \leftarrow c_i \times g(x,y-1) + f_y(x+i)$ $\phi_{y-1}(x) \leftarrow i$, where $i$ meets $$f_y(x+i) = \min_{-1 \leq j \leq 1}(f_y(x+j)).$$

step 2-3. Set $y \leftarrow y-1$.

step 2-4. If $y=0$, then, proceed to step 3.

Otherwise, proceed to step 2-2.

step 3. Path creation

For all $x \in S$, step 3-1. Set $p(0) \leftarrow x \in S$.

step 3-2. Set $y \leftarrow 1$.

step 3-3. Set $p(y) \leftarrow p(y-1) + \phi_y(p(y-1))$.

step 3-4. Set $y \leftarrow y+1$.

step 3-5. If $y=h$, then, add $p$ to $P$.

Otherwise, proceed to step 3-3.

step 4. Output $P$, and end the process. (14)

If only an end point of a path is output, $p(h-1)$ may be referred to or the operation of step 3 and the following operations may be replaced by those in an algorithm given in Expressions (15) in order to reduce the work memory capacity. This process corresponds to "forward path end point calculation" and "reverse path end point calculation".

step 3. Path end point calculation

For all $x \in S$, step 3-1. Set $e \leftarrow x \in S$.

step 3-2. Set $y \leftarrow 1$.

step 3-3. Set $e \leftarrow e + \phi_y(e)$.

step 3-4. Set $y \leftarrow y+1$.

step 3-5. If $y=h$, then, add $e$ to $E$.

Otherwise, proceed to step 3-3.

step 4. Output $E$, and end the process. (15)

The calculation of a start point/end point table of a path may also be performed using an algorithm given in Expressions (16). This process corresponds to "forward path start point/end point table calculation" and "reverse path start point/end point table calculation".

step 3. Path end point calculation

For all $x \in S$, step 3-1. Set $e \leftarrow x \in S$.

step 3-2. Set $y \leftarrow 1$.

step 3-3. Set $e \leftarrow e + \phi_y(e)$.

step 3-4. Set $y \leftarrow y+1$.

step 3-5. If $y=h$, then, set $T(x) \leftarrow e$.

Otherwise, proceed to step 3-3.

step 4. Output $T$, and end the process. (16)

where $w$: Lateral width of the image $h$: Longitudinal width of the image $g(x,y)$: Luminance value of a pixel at a position $(x,y)$ on an input image $f_y(x)$: Path cost information $\phi_y(x)$: Path creation information $p(y)$: Position $x$ of a path at a height $y$ $c_i$: Weight coefficient in cost evaluation $S$: Set of start points $E$: Set of end points $P$: Set of paths $T(x)$: End point of a path starting from a start point at a position $x$ in a start point/end point table (17)

Further, in the foregoing process, the method for holding the values given by Expressions (18) and (19) is brought into focus:

$$f_y(x) \quad (18)$$

$$\phi_y(x) \quad (19)$$

That is, the number of values given by Expression (18) and the number of values given by Expression (19) may be smaller than the value corresponding to the image size.

Specifically, the value given by Expression (18) represents information regarding path cost, and is held in a line buffer. In the process, it is only required to refer to the immediately preceding line, and the value given by Expression (18) may be held in two line buffers. The value given by Expression (19) represents information regarding path movement. In the process, areas including no paths are sequentially identified. Areas for holding the value given by Expression (19), which corresponds to the areas including no paths, may be sequentially reduced.

Figure 23:
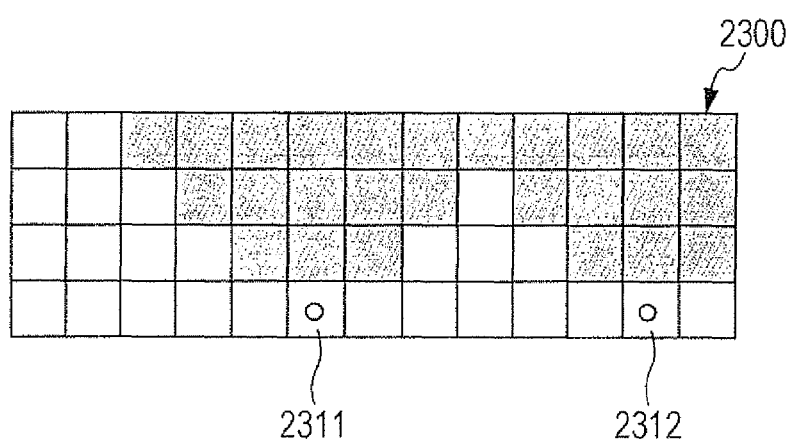
FIG. 23 illustrates an example of information required for the calculation of path information.

Further, when a start point is specified, as illustrated in an example in FIG. 23, the tree structures described above are formed. Thus, the amount of information required to calculate a shortest path may be smaller than the image size, and the number of areas for holding the values given by Expressions (18) and (19) may further be reduced. As illustrated in the example in FIG. 23, if start points 2311 and 2312 are defined in an image 2300, dark pixels are pixels that are to be referred to in the analysis, and white pixels are pixels that are not necessarily referred to in the analysis.

<Experiment Results A>

Experiment results according to the foregoing examples of the exemplary embodiment will be described with reference to FIGS. 24, 25, and 26.

FIG. 24 illustrates an example of a target image (character image showing "Character") 2400. FIG. 25 illustrates an example of the segmentation of the target image 2400 according to this exemplary embodiment. FIG. 26 illustrates an example of projection information on the target image 2400.

The experiment results will be discussed from the following three points:

(1) Separation of Even an Area Including a Gap in a Character Image that is Inseparable in Projection Information As illustrated in the example in FIG. 26, a "ter" character image portion (see the example in FIG. 24) in the target image 2400 is a portion including gaps in a character image that it is difficult to separate in projection information 2600. That is, the separation technique of the related art based on projection information would make it difficult to segment the image 2400 because no pronounced troughs occur in the projection information 2600, as illustrated in the example in FIG. 26.

In the image 2400, as illustrated in the example in FIG. 25, this exemplary embodiment allows the calculation of separation paths configured to extend between the individual characters in the character image 2400.

(2) Separation of Connected Components

In the target image 2400, "har", "act", and "er" character image portions (see the example in FIG. 24) contain portions connected to the adjacent character image portions.

As illustrated in the example in FIG. 25, in this exemplary embodiment, even connected character image portions are also separated because, as described above, the image segmentation mechanism based on shortest paths allows the calculation of a minimum-cost or maximum-cost separation path within a range where the shortest paths are movable.

(3) Supporting of Multi-Value Images.

The image 2400 illustrated in the example in FIG. 24 is a multi-value image. The process according to the foregoing exemplary embodiment is designed to support multi-value images including binary images. This may eliminate the need for setting, for example, a threshold value for each received image, which may be involved in binarization.

The exemplary embodiment of the invention described in the section <A> may provide an image processing apparatus as follows.

(A1) An image processing apparatus comprising:

a first path information calculation unit that calculates first path information, the first path information being information indicating a first path configured to separate an area from an image;

a second path information calculation unit that calculates second path information, the second path information being information indicating a second path extending in a direction opposite to a direction in which the first path extends and configured to separate the area from the image; and a path selection unit that selects one of the first path information calculated by the first path information calculation unit and the second path information calculated by the second path information calculation unit.

(A2) The image processing apparatus according to (A1), wherein each of the first path and the second path is a path along which a cumulative value of luminance values of pixels satisfies a predetermined condition.

(A3) The image processing apparatus according to (A1) or (A2), wherein the second path information calculation unit calculates the second path information in accordance with the first path information calculated by the first path information calculation unit, and wherein, in the second iteration and subsequent iterations of process, the first path information calculation unit calculates the first path information in accordance with the second path information calculated by the second path information calculation unit.

(A4) The image processing apparatus according to (A3), wherein each of a process performed by the first path information calculation unit and a process performed by the second path information calculation unit is terminated if the process has been performed a predetermined number of times or if the first path information calculated by the first path information calculation unit and the second path information calculated by the second path information calculation unit match.

<B>

Next, an exemplary embodiment based on the technique described in the section <A> will be described. A separation path calculated using a technique disclosed in Japanese Unexamined Patent Application Publication No. 04-10089, other than a separation path calculated using the technique described in the section <A>, may be used.

An overview of an exemplary embodiment in the section <B> will be described. In this exemplary embodiment, a separation path rather than projection distribution or connected components is used. Here, the term "separation path" may be equivalent to that described above in the section <A>. The section <A> discusses an exemplary embodiment for receiving a character string image and calculating a separation path for outputting a sub-image including a single character or a quasi-character. In the exemplary embodiment given in the section <B>, in contrast, a received document image is separated into sub-images which may be character string images by using separation paths, and the sub-images are output.

In the exemplary embodiment in the section <B>, a separation path is calculated so that the cost on the path (that is, a cumulative value of luminance values of pixels) becomes minimum or maximum. Accordingly, a separation boundary between character strings, which may not necessarily appear in the projection distribution, is specified, connections between the character strings are separated, and separation boundaries between the characters are specified.

If the direction of a character string of a paragraph is unknown, it needs to be determined. In the exemplary embodiment in the section <B>, the direction of a character string may be determined by comparing separation paths in multiple directions.

In the calculation of a separation path as defined above in a document image, the following characteristics are found:

(1) A separation path in a correct direction is less curved than a separation path in a wrong direction.

(2) If no separation based on separation paths is performed (the number of separation paths is less than or equal to two), a single character or single character string is obtained.

The exemplary embodiment in the section <B> relates to an image processing apparatus configured to separate (hereinafter also referred to as "cut out") an area of a character in an image. More specifically, an image processing apparatus according to the exemplary embodiment may be an apparatus suitable for use in the field of character recognition techniques, and may be an apparatus configured to determine the direction of a character string included in a target document image and to separate an image of the character string from the target document image.

To help clarify the following description, a description will be given of the field of character recognition techniques. For convenience of description, the field of character segmentation techniques in character recognition is classified into the following categories:

(1) Determination of the Attributes of Areas (Character Area Non-Character Area) and Separation of the Areas It is determined whether an area in an image is a character area or a non-character area, and the area is separated.

(2) Determination of the Direction of a Character String Area and Separation of the Character String Area In an image (including a character area), the direction of a character string area (whether characters written vertically or horizontally) in the character area is determined, and the character string area is separated.

(3) Separation of a Single Character Area

Characters are separated from an image (including a character area and a character string area) one by one.

The exemplary embodiment given in the section <B> particularly relates to the category (2) above.

The technique (2) contains two techniques as follows:

(A) Determination of the direction of a character string (B) Separation of the character string (area)

If the direction of a character string is unknown, the technique (2) may have the features of the techniques (A) and (B) in series. The exemplary embodiment given in the section <B> provides an integration of the techniques (A) and (B).

The directions in which a separation path is to be determined may be two directions, namely, a lateral direction (hereinafter also referred to as a "horizontal direction", which may be a nearly horizontal direction) and a longitudinal (hereinafter also referred to as a "vertical direction", which may be a nearly vertical direction). A separation path is a line segment that separates a character image from an image.

In this exemplary embodiment, various kinds of determination are performed on the basis of the feature value of a separation path. A feature value of a separation path will be described hereinafter.

A feature value of a separation path may be calculated on the basis of the number of separation paths, the position and shape of each path, and the luminance values of pixels along a path (the luminance value of a pixel is hereinafter also referred to as the "pixel value"). These values are given in Table 2, by way of example. Corresponding symbols are also defined, where i denotes an index associated with the number of paths.

TABLE 2

| Feature value of separation path | Symbol |
| --- | --- |
| Number of paths | Num |
| Curve | $Curl_i$ |
| Thickness | $Thick_i$ |
| Cumulative value of pixel values along path | $Cost_i$ |

The feature values given by way of example in Table 2 will be described hereinafter.

The feature value "Num" represents the number of separation paths.

The feature value "$Curl_i$" represents a value indicating the degree of curve of a separation path i in terms of shape, where i≤Num. The term "curve", as used here, means a difference value between a straight line directed from a start point and an end point of a separation path i and the separation path i. If the former (a straight line directed from a start point and an end point of a separation path i) is represented by $f_i(x)$ and the latter (separation path i) is represented by $p_i(x)$, the curve is defined by:

$$\Sigma x |f_i(x) - p_i(x)| dx, \text{Max}(|f_i(x) - p_i(x)|)$$

or $$\Sigma x (f_i(x) - p_i(x))^2 dx$$

The feature value "$Thick_i$" represents the thickness of a separation path i. The feature value "$Thick_i$" may correspond to the distance between adjacent character strings for the purpose of character string separation, where i≤Num.

The feature value "$Cost_i$" represents the cost defined by separation path calculation. Alternatively, a cumulative value of pixel values along a separation path i may be determined separately, where i≤Num.

The above feature values may be normalized by the length of a separation path because the separation path has a different length in each direction (horizontal direction, vertical direction).

In the exemplary embodiment given in the section <B>, by way of example, the above feature values are calculated in a "path feature value calculation process".

<B-1.1 Unit of Analysis of Predetermined Interval in Separation Path Calculation>

Figure 27A:
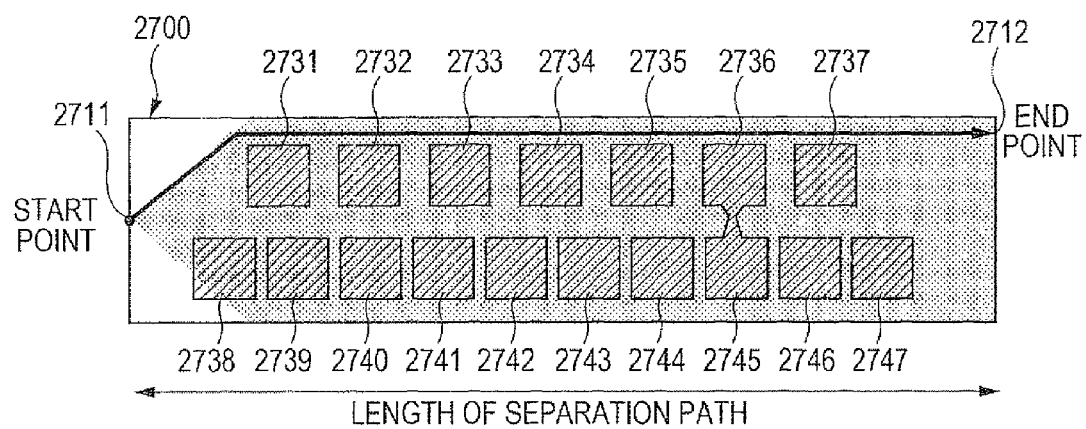
FIGS. 27A and 27B illustrate an example of a separation path calculation process.
Figure 27B:
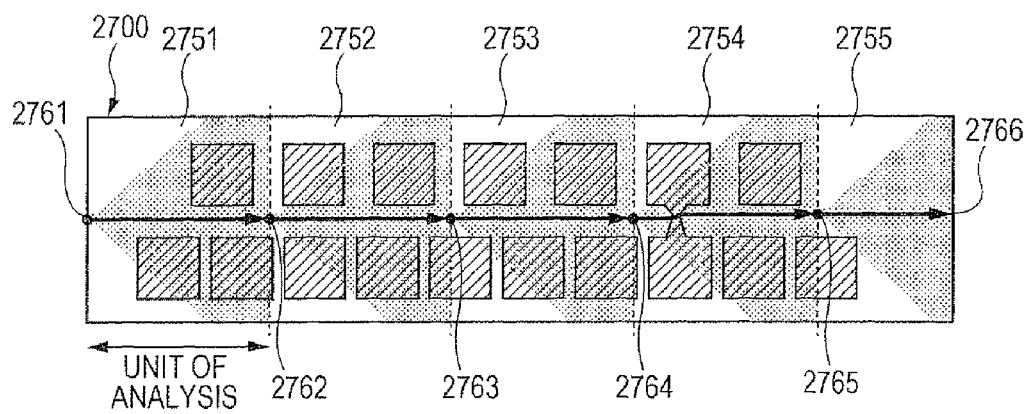

A description will be given with reference to FIGS. 27A and 27B. FIGS. 27A and 27B illustrate an example of a separation path calculation process.

In the separation path calculation technique given in the section <A> or the separation path calculation technique described in Japanese Unexamined Patent Application Publication No. 04-10089, a path having minimum or maximum $Cost_i$ within a movement range of a separation path is calculated. In this case, the longer a separation path, the larger the movement range of the separation path. If the movement range of the separation path is larger more than necessary, as illustrated by way of example in FIG. 27A, the presence of local obstacle patterns (obstacle patterns 2731 to 2747, for example, character images) may have a large effect on the separation path calculation. That is, for the purpose of the cut-out of a character string, the relationship between the length of a separation path and the movement range of the separation path described above may have a negative effect on the separation accuracy. For example, as illustrated by way of example in FIG. 27A, since the obstacle patterns 2736 and 2745 have areas that are in contact with each other due to noise, writing conditions, or the like, a path having minimum or maximum $Cost_i$ extends from a start point 2711 to an end point 2712 through an upper passage.

Thus, in separation path calculation, a separation path is calculated within a predetermined range including a portion of a character image within a target image so that a cumulative value of pixel values along the path satisfies a predetermined condition. Specifically, as illustrated by way of example in FIG. 27B, the target image is divided into units of analysis of predetermined intervals, and the repetition of determining a separation path in a given interval using an end point of a separation path in the adjacent preceding interval as a start point of the given interval (for example, using an intermediate point 2762 that is an end point of an area 2751 as a start point of an area 2752) narrows down the movement range of the separation path. Thus, the effect of the presence of local obstacle patterns on the separation path calculation may be reduced. Therefore, in an area 2754, a separation path traversing the contact between the obstacle patterns 2736 and 2745 is calculated. Accordingly, a separation path adjusted to travel straight is obtained. The area 2751 and the like having a predetermined range may be equal or different in size. For example, the size of a character in a target image may be measured, and the size of the area 2751 and the like may be determined on the basis of a multiple of the size of the character, or the size of the area 2751 and the like may be determined so as to include a predetermined number of characters.

In particular, in the technique given in the section <A>, a line buffer for $Cost_i$ is provided in the process of separation path calculation. In this case, a substantially equivalent process may be obtained merely by initializing the line buffer for each predetermined length.

<B-1.2 Combining of Plural Equivalent Separation Paths>

After the calculation of separation paths using the technique described in the section <A>, plural equivalent separation paths are combined.

In the combining of plural equivalent separation paths, if the width of a gap between adjacent separation paths calculated satisfies a predetermined condition, it is determined that the adjacent separation paths are equivalent separation paths regardless of the luminance values of the pixels in the gap, and the equivalent separation paths are combined. Alternatively, if a cumulative value of the luminance values of pixels in a gap between adjacent separation paths calculated satisfies a predetermined condition, it is determined that the adjacent separation paths are equivalent separation paths, and the equivalent separation paths are combined.

Figure 28:
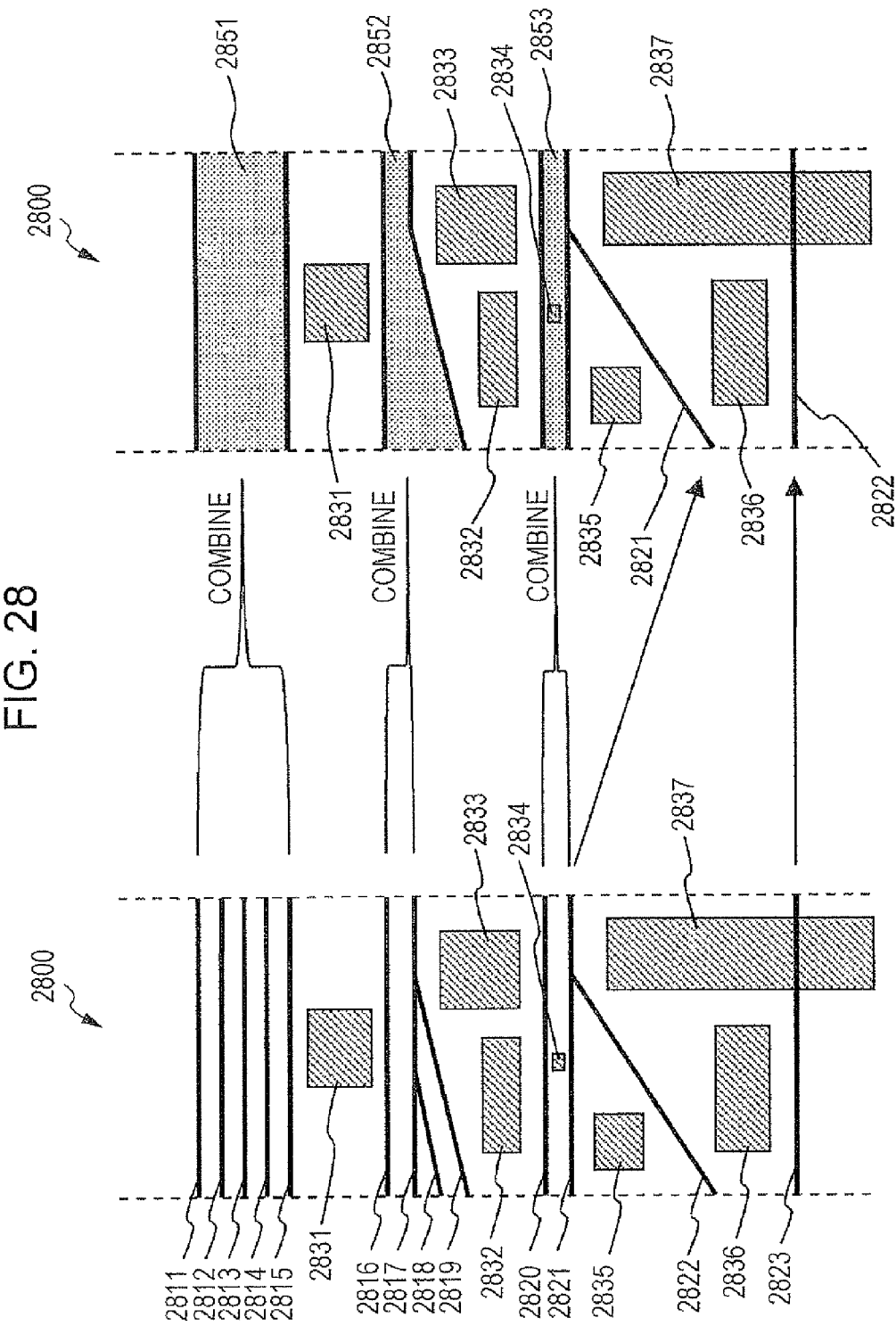
FIG. 28 illustrates an example of a separation path combining process.

The combination of equivalent separation paths will now be described using FIG. 28. FIG. 28 illustrates an example of a separation path combining process. Depending on an obstacle pattern in a gap between two adjacent separation paths, adjacent separation paths may be determined to be equivalent separation paths for the purpose of separation, and are combined into a single separation path. In FIG. 28, separation paths 2811 to 2815 are combined into a separation path 2851, separation paths 2816 to 2819 are combined into a separation path 2852, and separation paths 2820 and 2821 are combined into a separation path 2853. Separation paths 2822 and 2823 are not combined with other separation paths because no equivalent separation paths are present. Each of the combined separation paths has a thickness corresponding to one pixel or more. The obstacle pattern 2834 among the obstacle patterns 2831 to 2837 may be a noise.

Figure 29:
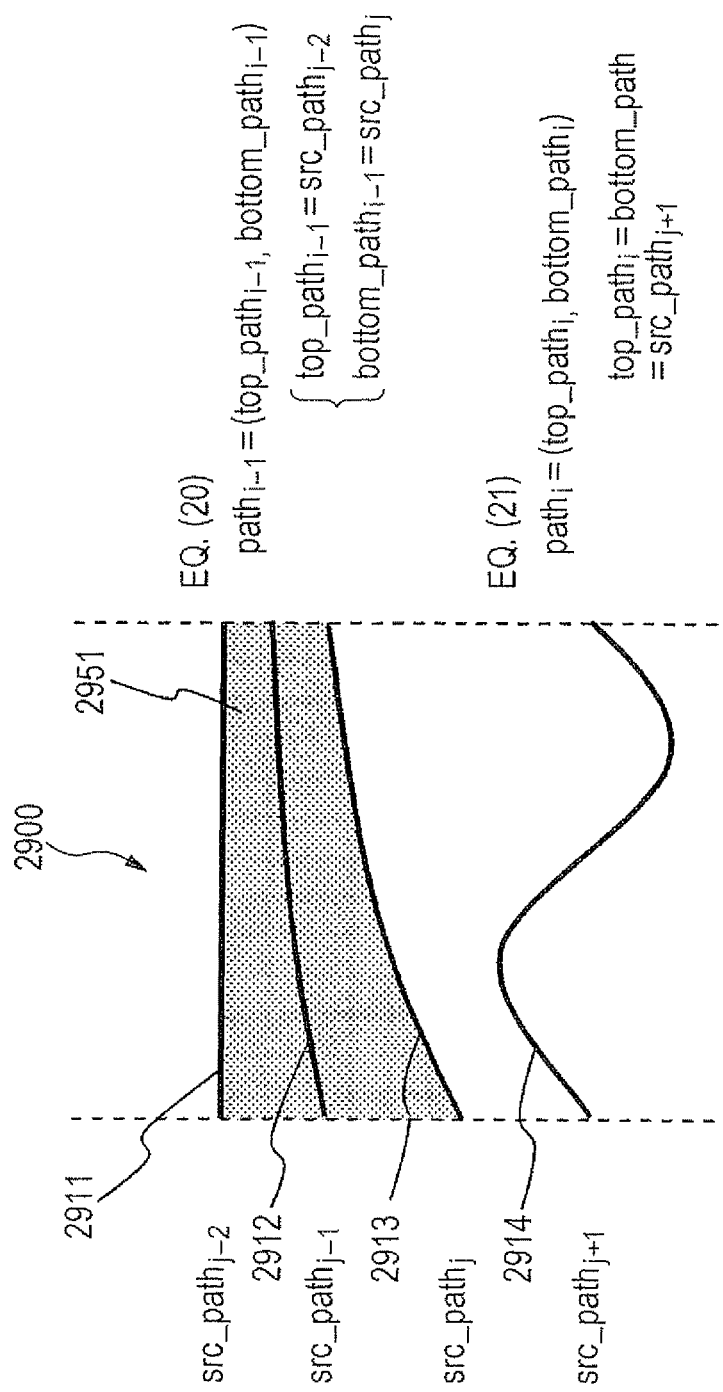
FIG. 29 illustrates an example of a separation path combining process.

A description will be given using FIG. 29. FIG. 29 illustrates an example of a separation path combining process. Let a combined separation path be $path_i$. The separation path $path_i$ is represented using two separation paths that are lines defining the contours of the separation path $path_i$, which is given by $path_i = (top\_path_i, bottom\_path_i)$. In this case, if a separation path obtained before combining is represented by $src\_path_j$, $top\_path_i$ and $bottom\_path_i$ define $src\_path_j$. In the combining of three or more separation paths, a separation path that does not define an end of the combined separation path (in the example in FIG. 29, $src\_path_{j-1}$ representing a separation path 2912) is deleted. A combined separation path $path_i$ having a thickness satisfies "$top\_path_i \neq bottom\_path_i$". Other paths $path_i$ satisfy "$top\_path_i = bottom\_path_i$". While separation paths in the lateral direction are represented using upper end (top) and lower end (bottom) separation paths, separation path in the longitudinal direction may be represented using right end and left end separation paths.

A separation path 2951 produced by combining three separation paths in an upper portion in FIG. 29 (a separation path 2911, the separation path 2912, and a separation path 2913) is expressed by Expression (20).

$$path_{i-1} = (top\_path_{i-1}, bottom\_path_{i-1}) \qquad (20)$$

$$\begin{cases} top\_path_{i-1} = src\_path_{j-2} \\ bottom\_path_{i-1} = src\_path_j \end{cases}$$

In other words, the separation path 2951 is expressed using information on the lines defining the contours of the separation path 2951.

Further, one separation path in a lower portion in FIG. 29 (a separation path 2914) may be expressed by Expression (21) in similar notation although it is not produced as a result of combining.

$$path_i = (top\_path_i, bottom\_path_i) \quad (21)$$

$$top\_path_i = bottom\_path_i = src\_path_{j+1}$$

If the breadth of a gap between adjacent separation paths satisfies a predetermined condition (for example, less than or equal to a predetermined value), the separation paths may be combined regardless of the presence or absence of an obstacle pattern. Similarly, if the cost (cumulative value of pixel values) in a gap between adjacent separation paths satisfies a predetermined condition (for example, less than or equal to a predetermined value), the separation paths may be combined.

Alternatively, the combining of separation paths and the calculation of feature values may be used. For example, if it is assumed that a path $path_i$ is produced by combining n paths $src\_path_j$, a feature value $Thick_i$ described below may be set to the value n.

<B-1.3 Feature Values of Separation Path>

A specific example of the feature values of a separation path given in Table 2 will be illustrated on the basis of the definitions of a separation path described above.

The following description will be given in the context of separation paths in the lateral direction for ease of description. Separation paths in the longitudinal direction may be used by reading upper end as right end and lower end as left end. Hereinafter, it is assumed that a path starts from a start point $(x_s, y_s)$ and reaches an end point $(x_e, y_e)$, where $x_s < x_e$. A vertical position y of a separation path i with respect to a horizontal position x is represented by "$top\_path_i(x)$, $bottom\_path_i(x)$". Also, a pixel value of a target image at a horizontal position x and a vertical position y is represented by $img(x, y)$. Here, for ease of description, the larger value $img(x, y)$ a pattern has, the more possibly it may be an obstacle pattern.

The feature value "Num" represents the number of combined separation paths.

The feature value "$Curl_i$" is extracted using Expression (22), (23), (24), (25), or the like.

$$Curl_i = \begin{cases} \dfrac{\sum_{x=x_s}^{x_e} |f(x) - top\_path_i(x)|}{x_e - x_s} & \ldots (top\_path_i = bottom\_path_i) \\ 0 & \ldots (others) \end{cases} \quad (22)$$

$$Curl_i = \begin{cases} \dfrac{\sum_{x=x_s}^{x_e} (f(x) - top\_path_i(x))^2}{x_e - x_s} & \ldots (top\_path_i = bottom\_path_i) \\ 0 & \ldots (others) \end{cases} \quad (23)$$

$$Curl_i = \dfrac{\sum_{x=x_s}^{x_e} |f(x) - \lfloor p_i(x) \rfloor|}{x_e - x_s} \quad (24)$$

$$\text{where } p_i(x) = \dfrac{top\_path_i(x) + bottom\_path_i(x)}{2}$$

$$Curl_i = \dfrac{\sum_{x=x_s}^{x_e-d} |\lfloor p_i(x+d) \rfloor - \lfloor p_i(x) \rfloor|}{x_e - x_s} \quad (25)$$

The feature value "$Thick_i$" is extracted using Expression (26), (27), (28), or the like.

$$Thick_i = \begin{cases} 1 & \ldots (top\_path_i = bottom\_path_i) \\ \max_{x_s \le x \le x_e} |top\_path_i(x) - bottom\_path_i(x)| & \ldots (others) \end{cases} \quad (26)$$

$$Thick_i = \begin{cases} 1 & \ldots (top\_path_i = bottom\_path_i) \\ \min_{x_s \le x \le x_e} |top\_path_i(x) - bottom\_path_i(x)| & \ldots (others) \end{cases} \quad (27)$$

$$Thick_i = \dfrac{\sum_{x=x_s}^{x_e} (bottom\_path_i(x) - top\_path_i(x))}{x_e - x_s} \quad (28)$$

The feature value "$Cost_i$" is extracted using Expression (29), (30), (31), or the like.

$$Cost_i = \begin{cases} \sum_{x=x_s}^{x_e} img(x, top\_path_i(x)) & \ldots (top\_path_i = bottom\_path_i) \\ \sum_{x=x_s}^{x_e} \sum_{y=top\_path_i(x)}^{bottom\_path_i(x)} img(x, y) & \ldots (others) \end{cases} \quad (29)$$

$$Cost_i = \sum_{x=x_s}^{x_e} img(x, \lfloor p_i(x) \rfloor) \quad (30)$$

$$Cost_i = \sum_{x=x_s}^{x_e-1} (c_i \times img(x, \lfloor p_i(x) \rfloor)) \quad (31)$$

$$\text{where } c_i = \begin{cases} 1 & \ldots (p_i(x) = p_i(x+1)) \\ c & \ldots (others) \end{cases}$$

Figure 30:
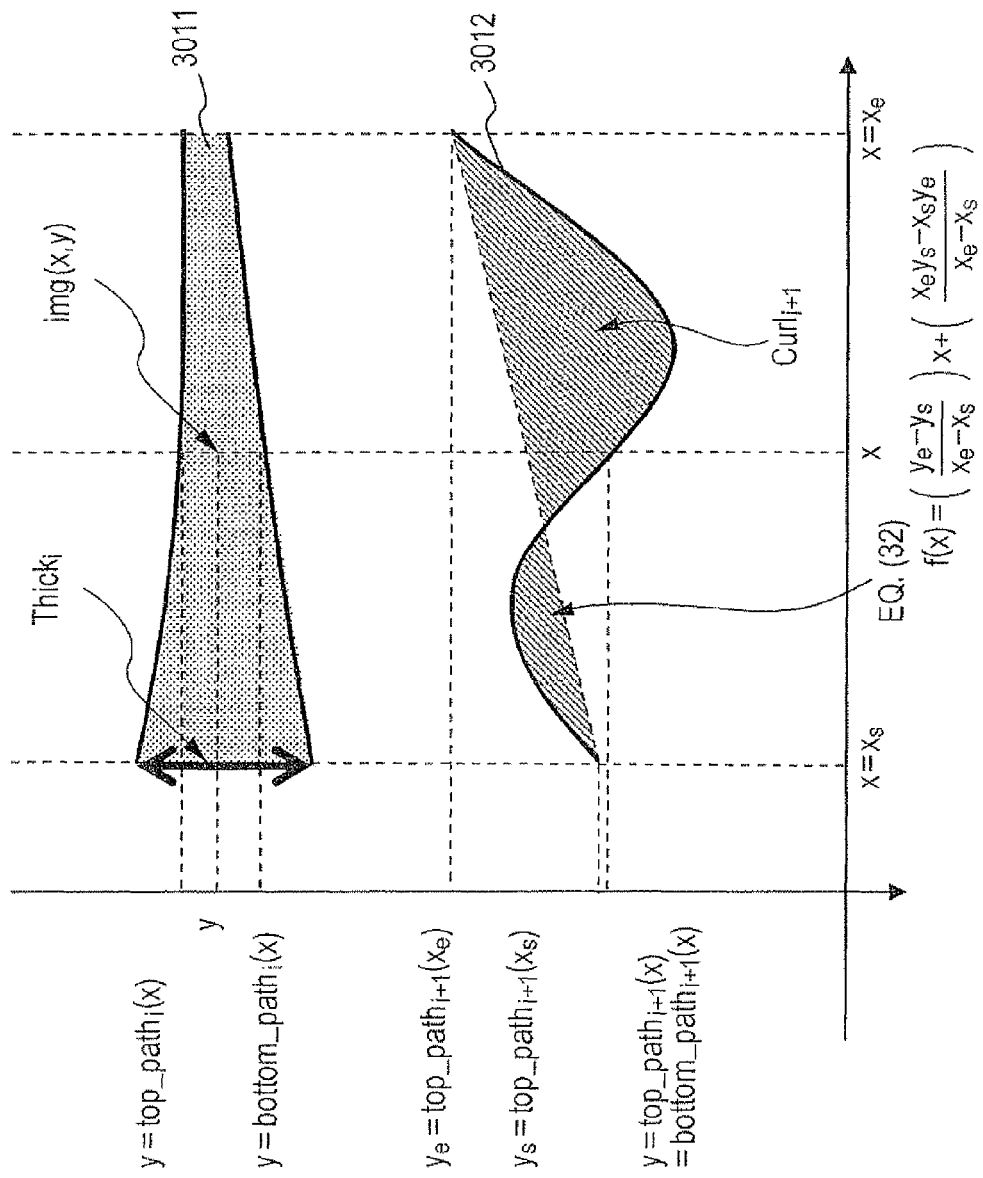
FIG. 30 illustrates an example of feature values.

The feature values described above will be described using FIG. 30. FIG. 30 illustrates the feature values given in Expressions (22) and (26), by way of example. That is, the feature value $Thick_i$ of a separation path 3011 illustrated in the example in FIG. 30 is extracted using Expression (26), and the feature value $Curl_{i+1}$ of a separation path 3012 is extracted using Expression (22). The separation path 3011 has a thickness of 1 or more, and the separation path 3012 has a thickness of 1.

The feature value $Curl_i$ will be described using the separation path 3012. In the example in FIG. 30, the difference (the area of a diagonally hatched portion) between the separation path 3012 indicated by a solid line and a line f(x) (Expression (32)) extending the start point and the end point of the separation path 3012 is normalized with the length of the separation path 3012 ($=x_e - x_s$).

$$f(x) = \left(\dfrac{y_e - y_s}{x_e - x_s}\right)x + \left(\dfrac{x_e y_s - x_s y_e}{x_e - x_s}\right) \quad (32)$$

For the feature value $Curl_i$, as given in Expressions (22), (23), and (24), the difference between a given separation path and a line connecting the start point and the end point of the given separation path may be evaluated. Specifically, Expression (22) defines the absolute value of the difference between a path having no thickness and a line connecting the start point and the end point thereof, Expression (23) defines the square root of the difference between a path having no thickness and a line connecting the start point and the end point thereof, and Expression (24) defines the absolute value of the difference similar to that in Expression (22) when the center line of a path having a thickness is calculated. Further, as given in Expression (25), the derivative value of a path itself (derivative distance $d_{[px]}$) may be evaluated.

For the feature value $Thick_i$, as given in Expressions (26), (27), and (28), a maximum value and a minimum value, or an average value may be used.

For the feature value $Cost_i$, as given in Expressions (29) and (30), a cumulative value of pixel values along a path may be evaluated. Specifically, Expression (29) represents an example of the evaluation of a cumulative value of pixel values along a path. Expression (30) represents an example of the evaluation of a cumulative value of pixel values along a center line of a path. Alternatively, as given in Expression (31), a cumulative value of pixel values along a weighted path may be evaluated by using a curved path. That is, a separation path may be calculated so that a cumulative value of the products of the luminance values of pixels along the path and weight coefficients based on the movement of the path satisfies a predetermined condition. The weight coefficients may be determined on the basis of the relationship between $p_i(x)$ and $p_i(x+1)$. Specifically, if both are the same (that is, in the case of a straight line), the weight coefficients ($c_i$) is set to 1. If both are different (that is, in the case of an oblique line), the weight coefficient ($c_i$) is set to a value c (larger than 1).

<B-2 Examples of Exemplary Embodiment>

Here, examples of the exemplary embodiment for separating a character string from a document image and determining the direction of the character string will be described.

First Example

An example of the exemplary embodiment for, receiving a document image and separating a character string will be described.

In a first example of the exemplary embodiment, it is assumed that the direction of a character string in a received document image is known.

Figure 31:
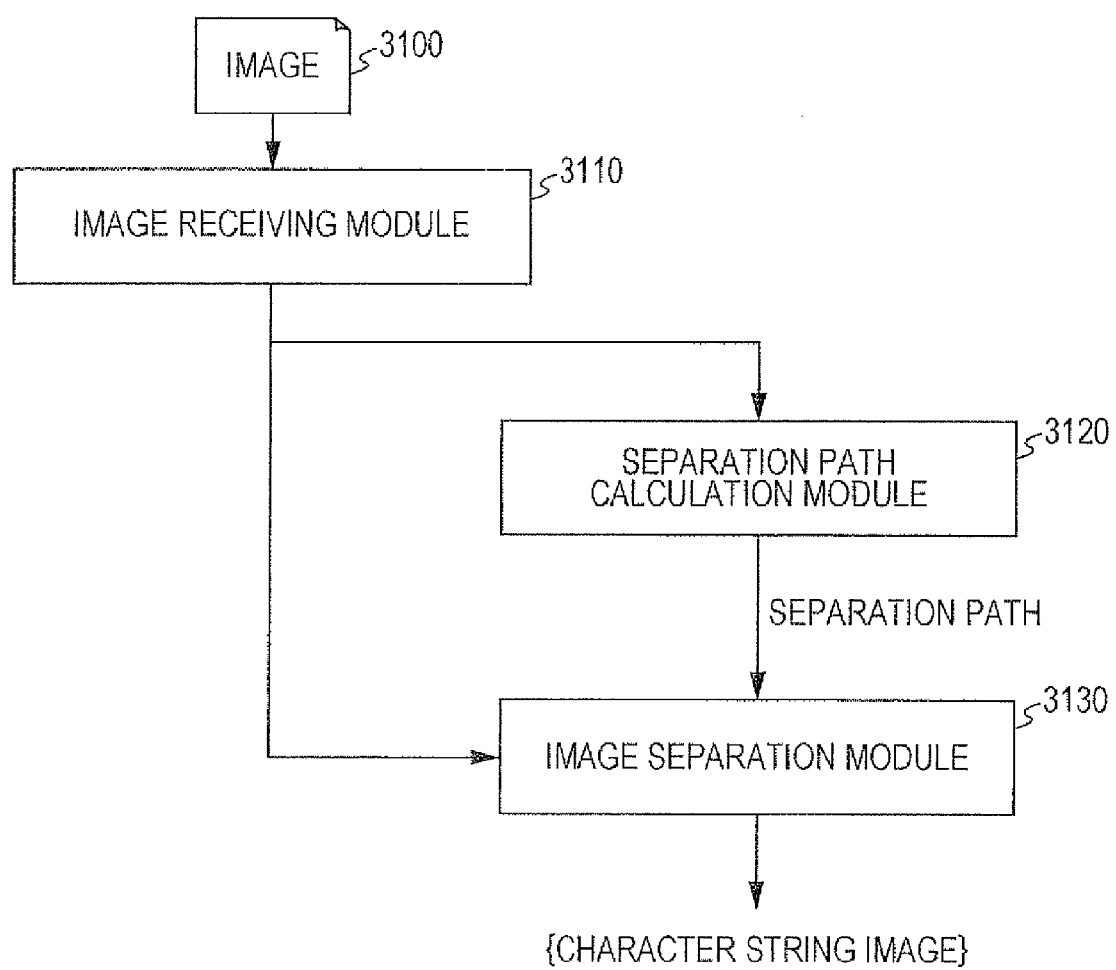
FIG. 31 is a conceptual module configuration diagram illustrating an example configuration of a first example of another exemplary embodiment.

FIG. 31 is a conceptual module configuration diagram illustrating an example configuration of the first example. The example configuration of the first example is designed to calculate a separation path in a character string direction that is known, separate an image on the basis of the separation path, and output the separated image. The example configuration of the first example includes an image receiving module 3110, a separation path calculation module 3120, and an image separation module 3130.

The image receiving module 3110 is connected to the separation path calculation module 3120 and the image separation module 3130. The image receiving module 3110 receives an image 3100, and passes the image to the separation path calculation module 3120 and the image separation module 3130. The term "receiving an image" includes reading an image using, for example, a scanner, a camera, or any other suitable device, receiving an image using a facsimile machine or the like from an external device via a communication line, and reading an image stored in a hard disk (including a built-in hard disk of a computer and a hard disk connected via a network) or the like. The image may be a binary image or a multi-value image (including a color image). One or multiple images may be received. Additionally, any kind of image including at least a character image, such as a document for business use or a pamphlet for advertisement, may be used.

The separation path calculation module 3120 is connected to the image receiving module 3110 and the image separation module 3130. The separation path calculation module 3120 calculates a separation path for separating a character image from the image 3100 received by the image receiving module 3110. The calculation may be implemented using, for example, the techniques given in the sections <A>, <B-1.1 Unit of analysis of predetermined interval in separation path calculation>, and <B-1.2 Combining of plural equivalent separation paths>. Since the character string direction of the image 3100 received by the image receiving module 3110 is known, a separation path in this direction may be calculated.

The image separation module 3130 is connected to the image receiving module 3110 and the separation path calculation module 3120. The image separation module 3130 separates the image 3100 received by the image receiving module 3110 into plural character string images using the separation path calculated by the separation path calculation module 3120. For example, the image separation module 3130 performs a process for separating an area in a gap between paths $bottom\_path_{i-1}$ and $top\_path_i$. If a predetermined number or more obstacle patterns are present along the separation path, that is, if the feature value$Cost_{i-1}$ or $Cost_{i-1}$ is greater than or equal to a predetermined value, an area of a gap between the paths $top\_path_{i-1}$ and $top\_path_i$, a gap between the paths $bottom\_path_{i-1}$ and $bottom\_path_i$, or a gap between the paths $top\_path_{i-1}$ and $bottom\_path_i$ is separated so that a portion of the character pattern is not lost in an output character string image.

Second Example

An example of the exemplary embodiment for receiving a document image and determining the direction of a character string will be described.

Figure 32:
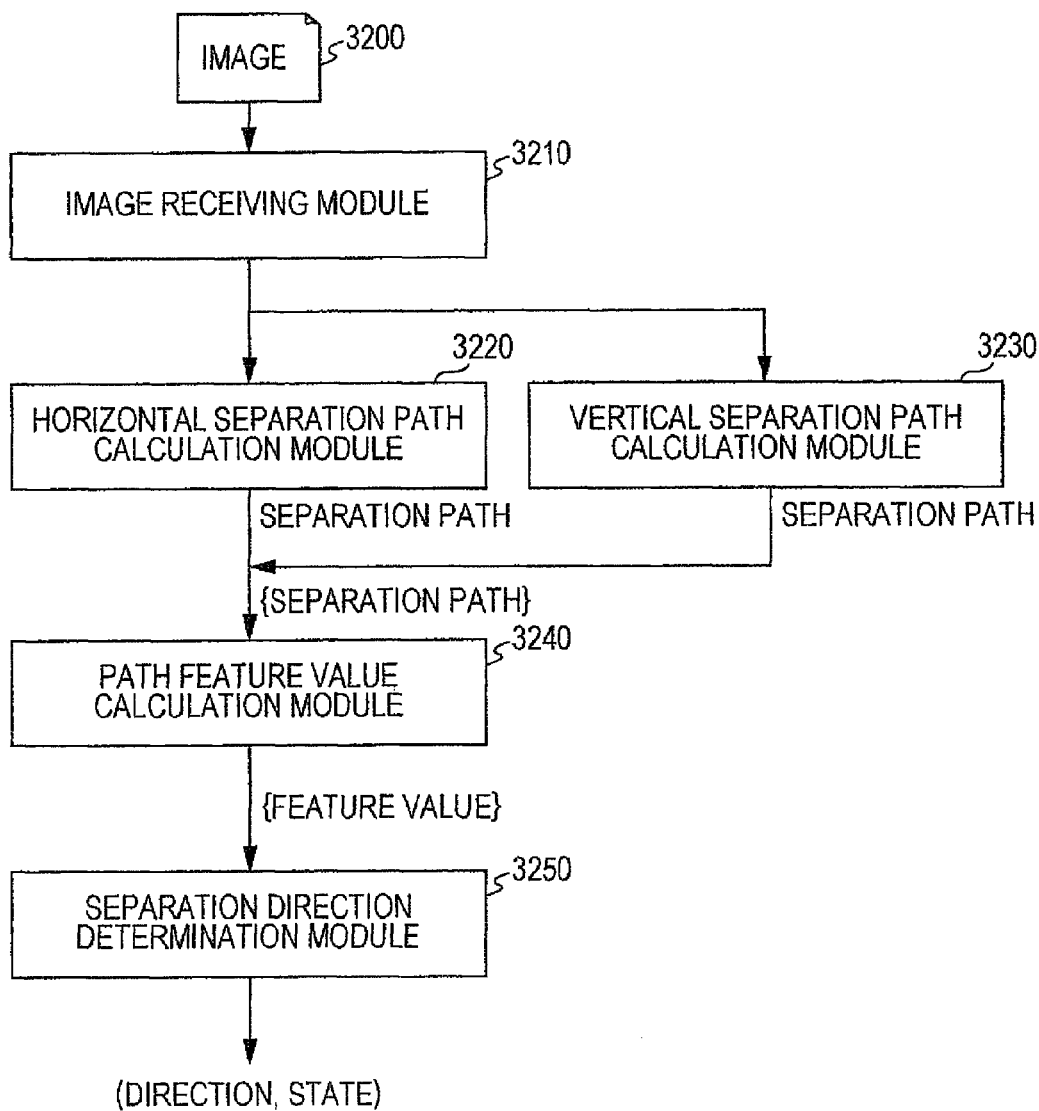
FIG. 32 is a conceptual module configuration diagram illustrating an example configuration of a second example of the exemplary embodiment.

FIG. 32 is a conceptual module configuration diagram illustrating an example configuration of a second example of the exemplary embodiment. The example configuration of the second example is designed to calculate horizontal and vertical separation paths, calculate feature values of the individual separation paths, compare the feature values, and determine and output the direction and state of a character string. The example configuration of the second example includes an image receiving module 3210, a horizontal separation path calculation module 3220, a vertical separation path calculation module 3230, a path feature value calculation module 3240, and a separation direction determination module 3250.

The image receiving module 3210 is connected to the horizontal separation path calculation module 3220 and the vertical separation path calculation module 3230, and performs a process substantially equivalent to that of the image receiving module 3110 according to the first example of the exemplary embodiment. The image receiving module 3210 receives an image 3200, and passes the image 3200 to the horizontal separation path calculation module 3220 and the vertical separation path calculation module 3230. The direction of a character string in the image 3200 is not known. Therefore, it may be necessary to calculate separation paths in multiple directions (here, horizontal direction and vertical direction). Here, it is assumed that the image 3200 is a document image containing one paragraph.

The horizontal separation path calculation module 3220 is connected to the image receiving module 3210 and the path feature value calculation module 3240, and the vertical separation path calculation module 3230 is connected to the image receiving module 3210 and the path feature value calculation module 3240. The horizontal separation path calculation module 3220 and the vertical separation path calculation module 3230 may correspond to the separation path calculation module 3120 according to the first example of the exemplary embodiment, and calculate separation paths in multiple directions and pass the separation paths to the path feature value calculation module 3240.

The horizontal separation path calculation module 3220 calculates a separation path that is a horizontal line segment for separating a character image in the image 3200 received by the image receiving module 3210. The calculation may be implemented using, for example, the techniques given in the sections <A>, <B-1.1 Unit of analysis of predetermined interval in separation path calculation>, and <B-1.2 Combining of plural equivalent separation paths>.

The vertical separation path calculation module 3230 calculates a separation path that is a vertical line segment for separating a character image in the image 3200 received by the image receiving module 3210. The calculation may be implemented using, for example, the techniques disclosed in the sections <A>, <B-1.1 Unit of analysis of predetermined interval in separation path calculation>, and <B-1.2 Combining of plural equivalent separation paths>.

The path feature value calculation module 3240 is connected to the horizontal separation path calculation module 3220, the vertical separation path calculation module 3230, and the separation direction determination module 3250. The path feature value calculation module 3240 calculates feature values of the separation paths in the multiple directions calculated by the horizontal separation path calculation module 3220 and the vertical separation path calculation module 3230, and passes the feature values to the separation direction determination module 3250. For example, the path feature value calculation module 3240 may be implemented by the calculation of the feature values described above, those given by, for example, Expressions (22), (26), and (29), and the statistics of the values. Hereinafter, a maximum value, a minimum value, and an average value of a feature value F are represented by MaxF, MinF, and AvgF, respectively. For example, a maximum value of the curve is represented by MaxCurl.

Figure 33:
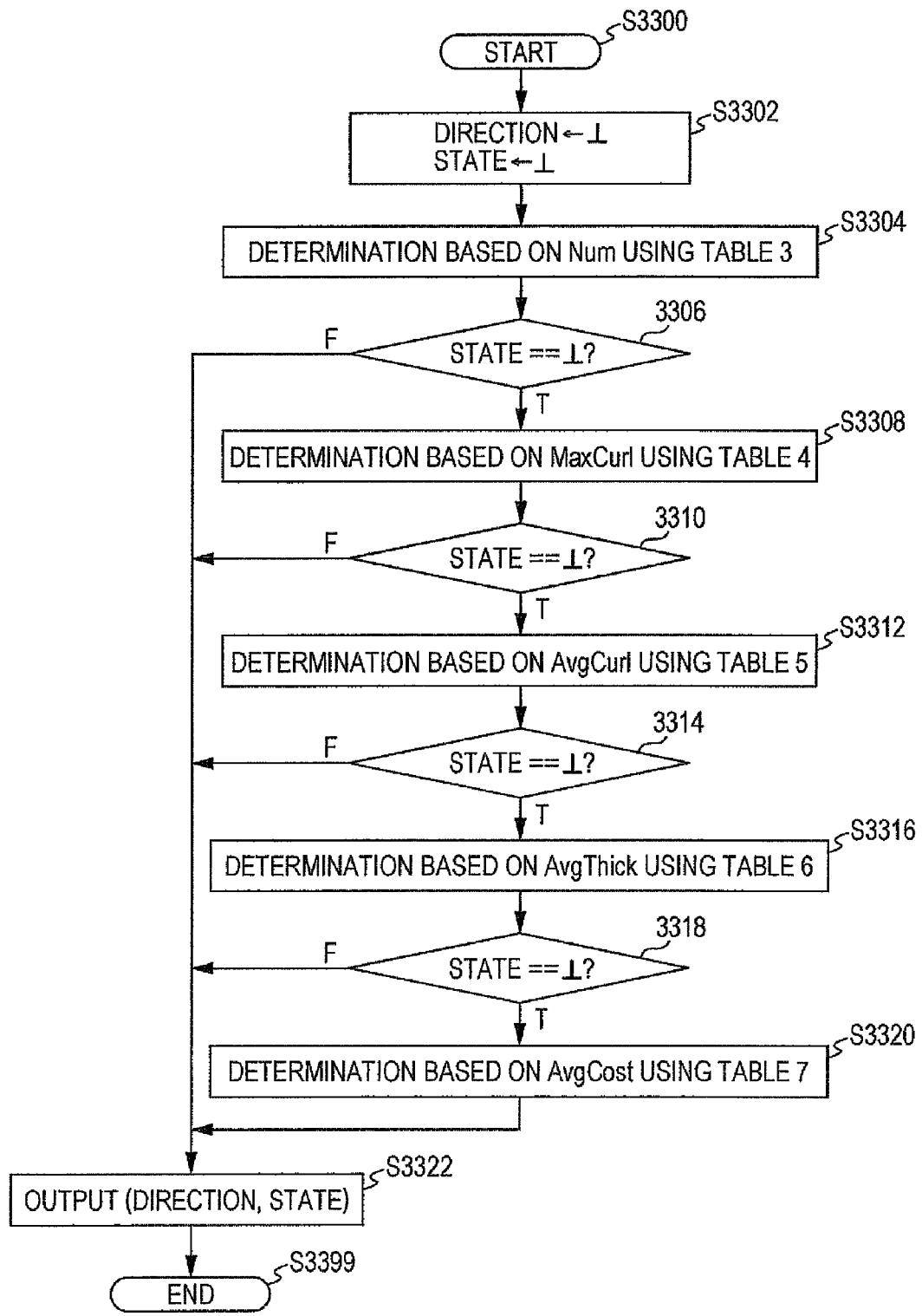
FIG. 33 is a flowchart illustrating an example of a direction determination process.

The separation direction determination module 3250 is connected to the path feature value calculation module 3240. The separation direction determination module 3250 determines the direction in which the image 3200 is to be separated and the state of a character image on the basis of the feature values calculated by the path feature value calculation module 3240, and selects a separation path among the separation paths in the multiple directions in accordance with the determination result. Specifically, a process according to a flowchart illustrated by way of example in FIG. 33 is performed. FIG. 33 is a flowchart illustrating an example of a direction determination process performed by the separation direction determination module 3250.

The flowchart illustrated by way of example in FIG. 33 is performed by the separation direction determination module 3250 using Tables 3, 4, 5, 6, and 7. The process will now be described.

TABLE 3

| | | H Num = 2 | |
|---|---|---|---|
| | | True | False |
| V Num = 2 | True | state ← C | direction ← V state ← T |
| | False | direction ← H state ← T | No operation (⊥) |

TABLE 4

| | MaxCurl | | |
|---|---|---|---|
| | others (H == V) | H < V | H > V |
| Process | No operation (⊥) | direction ← H state ← P | direction ← V state ← P |

TABLE 5

| | AvgCurl | | |
|---|---|---|---|
| | others (H == V) | H < V | H > V |
| Process | No operation (⊥) | direction ← H state ← P | direction ← V state ← P |

TABLE 6

| | AvgThick | | |
|---|---|---|---|
| | others (H == V) | H > V | H < V |
| Process | No operation (⊥) | direction ← H state ← P | direction ← V state ← P |

TABLE 7

| | AvgCost | | |
|---|---|---|---|
| | others (H == V) | H < V | H > V |
| Process | No operation (⊥) | direction ← H state ← P | direction ← V state ← P |

The separation direction determination module 3250 compares the feature values of the horizontal and vertical separation paths passed from the horizontal separation path calculation module 3220 and the vertical separation path calculation module 3230, and determines the direction in which the target image is to be separated (that is, the direction of a character string to be output, hereinafter referred to as a "direction") and the state of the target image (hereinafter referred to as a "state"). The direction and the state may be variables that may have the following values.

The direction may have the following three values:
(1) H: Horizontal
(2) V: Vertical
(3) ⊥: unidentifiable The state may have the following four values:
(1) P: Single paragraph
(2) T: Single character string
(3) C: Single character
(4) ⊥: unidentifiable In the flowchart illustrated by way of example in FIG. 33, the determination based on tables starts with the determination based on Table 3 as to whether the target image is a single character image, a single character string image, or any other image. This determination may be based on the number Num of separation paths. That is, if the number of horizontal separation paths and the number of vertical separation paths are two, the target image is determined to be a single character (C) image. If one of the number of horizontal separation paths and the number of vertical separation paths is two, the target image is determined to be a single character string (T) image. If the number of horizontal separation paths is two, the direction is horizontal (H). If the number of vertical separation paths is two, the direction is vertical (V). If the number of horizontal separation paths or the number of vertical separation paths is not two, no operation is performed (the state remains unidentifiable (⊥)).

The determinations based on Tables 4, 5, 6, and 7 may be the determinations of the direction of a character string using the corresponding feature values of a separation path.

In the flowchart illustrated by way of example in FIG. 33, the determinations are performed in the order of "determination based on Num" (Table 3), "determination based on Curl" (Tables 4 and 5), "determination based on Thick" (Table 6), and "determination based on Cost" (Table 7). The order of the determinations will now be described.

First, the direction determination performed by the separation direction determination module 3250 is the determination of a direction of a character string based on the shape of a separation path. For this reason, the "determination based on Cost" which is not the determination based on shape information may be performed in the lowest priority last stage.

Then, for the "determination based on Curl" and "determination based on Thick", which are determinations based on shape information, in order to support the arrangement such as itemization, in some cases, the direction in which the value MaxThick or AvgThick is maximum is not always a character string direction. In order to address such cases, the "determination based on Curl" (Tables 4 and 5) is performed prior to the "determination based on Thick" (Table 6).

Next, for the "determination based on Curl", the total number of separation paths to be calculated in the horizontal direction may not necessarily be the same as the total number of separation paths to be calculated in the vertical direction depending on the target document image (that is, for example, text may be written horizontally in a longitudinally long portion or written vertically in a laterally long portion). Since the average value of separation paths in a certain direction may be influenced by the total number of separation paths, the "determination based on MaxCurl" (Table 4) is performed prior to the "determination based on AvgCurl" (Table 5).

While the determinations described above are designed in the context of a document image containing plural character strings, a target document image may not necessarily contain plural character strings. Therefore, the "determination based on Num" (Table 3) is performed in the first stage, and it is determined whether the target document image is a single character image, a single character string image, or any other image.

In step S3302, ⊥ (unidentifiable) is substituted for the variable "direction", and ⊥ (unidentifiable) is substituted for the variable "state".

In step S3304, the determination based on Num using Table 3 is performed.

In step S3306, it is determined whether or not the variable "state" is unidentifiable (state=⊥). If the variable "state" is unidentifiable, the process proceeds to step S3308, or otherwise, the process proceeds to step S3322.

In step S3308, the determination based on MaxCurl using Table 4 is performed. That is, if the value MaxCurl in the horizontal direction is smaller than the value MaxCurl in the vertical direction, the direction is horizontal (H), and the state is a single paragraph (P). If the value MaxCurl in the horizontal direction is larger than the value MaxCurl in the vertical direction, the direction is vertical (V), and the state is a single paragraph (P). Otherwise (if both values are the same), no operation is performed (the state remains unidentifiable (⊥)).

In step S3310, it is determined whether or not the variable "state" is unidentifiable (state=⊥). If the variable "state" is unidentifiable, the process proceeds to step S3312, or otherwise, the process proceeds to step S3322.

In step S3312, the determination based on AvgCurl using Table 5 is performed. That is, if the value AvgCurl in the horizontal direction is smaller than the value AvgCurl in the vertical direction, the direction is horizontal (H), and the state is a single paragraph (P). If the value AvgCurl in the horizontal direction is larger than the value AvgCurl in the vertical direction, the direction is vertical (V), and the state is a single paragraph (P). Otherwise (if both values are the same), no operation is performed (the state remains unidentifiable (⊥)).

In step S3314, it is determined whether or not the variable "state" is unidentifiable (state=⊥). If the variable "state" is unidentifiable, the process proceeds to step S3316, or otherwise, the process proceeds to step S3322.

In step S3316, the determination based on AvgThick using Table 6 is performed. That is, if the value AvgThick in the horizontal direction is larger than the value AvgThick in the vertical direction, the direction is horizontal (H), and the state is a single paragraph (P). If the value AvgThick in the horizontal direction is smaller than the value AvgThick in the vertical direction, the direction is vertical (V), and the state is a single paragraph (P). Otherwise (if both values are the same), no operation is performed (the state remains unidentifiable (⊥)).

In step S3318, it is determined whether or not the variable "state" is unidentifiable (state=⊥). If the variable "state" is unidentifiable, the process proceeds to step S3320, or otherwise, the process proceeds to step S3322.

In step S3320, the determination based on AvgCost using Table 7 is performed. That is, if the value AvgCost in the horizontal direction is smaller than the value AvgCost in the vertical direction, the direction is horizontal (H), and the state is a single paragraph (P). If the value AvgCost in the horizontal direction is larger than the value AvgCost in the vertical direction, the direction is vertical (V), and the state is a single paragraph (P). Otherwise (if both values are the same), no operation is performed (the state remains unidentifiable (⊥)).

In step S3322, the set (direction, state) of the variable "direction" and the variable "state", is output.

Furthermore, an image separation module may be added to the configuration illustrated by way of example in FIG. 32. The image separation module may be configured to separate the image 3200 received by the image receiving module 3210 into plural sub-images by the separation path selected by the separation direction determination module 3250.

Third Example

Next, an example of the exemplary embodiment for receiving a document image, determining the direction of a character string, and performing a separation process will be described.

Figure 34:
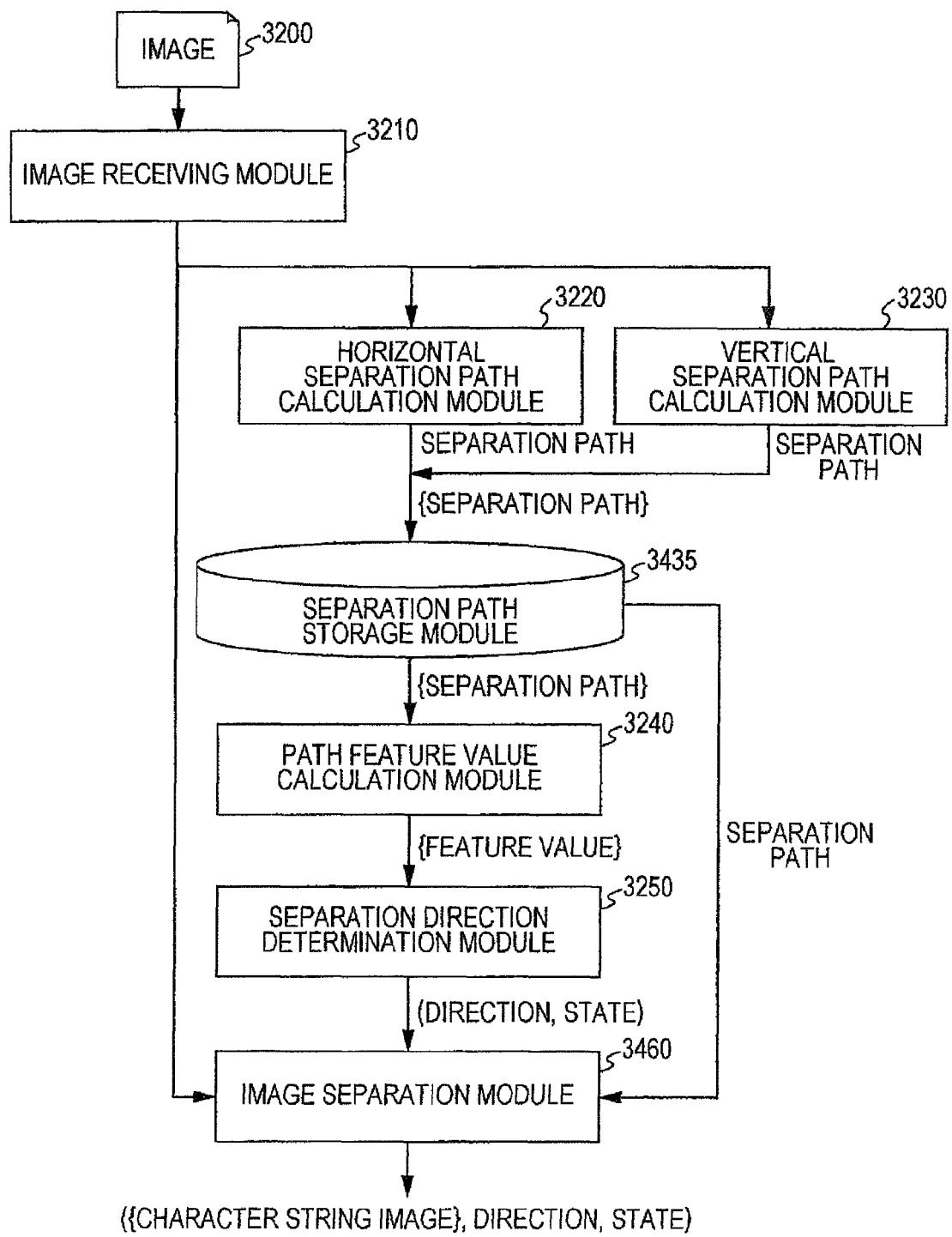
FIG. 34 is a conceptual module configuration diagram illustrating an example configuration of a third example of the exemplary embodiment.

FIG. 34 is a conceptual module configuration diagram illustrating an example configuration of a third example of the exemplary embodiment. The example configuration of the third example is designed to calculate horizontal and vertical separation paths, temporarily store the calculated separation paths, calculate feature values of the individual separation paths, compare the feature values, determine the direction and state of a character string, select the separation path in the determined direction, and separate an image accordingly. The example configuration of the third example includes an image receiving module 3210, a horizontal separation path calculation module 3220, a vertical separation path calculation module 3230, a separation path storage module 3435, a path feature value calculation module 3240, a separation direction determination module 3250, and an image separation module 3460.

Substantially the same components as those in the foregoing exemplary embodiment are assigned the same numerals and a redundant description thereof is omitted. That is, the elements other than a separation path storage module 3435 and an image separation module 3460 may be substantially equivalent to those in the second example (FIG. 32).

The separation path storage module 3435 is connected to the horizontal separation path calculation module 3220, the vertical separation path calculation module 3230, the path feature value calculation module 3240, and the image separation module 3460, and stores the separation paths calculated by the horizontal separation path calculation module 3220 and the vertical separation path calculation module 3230. The separation path storage module 3435 passes the separation paths to the path feature value calculation module 3240 or the image separation module 3460.

The image separation module 3460 is connected to the image receiving module 3210, the separation path storage module 3435, and the separation direction determination module 3250.

The determination and process performed by the image separation module 3460 are given in Table 8.

TABLE 8

| Direction | | State | |
|---|---|---|---|
| | | ∈ {T, C, ⊥} | ∈ others |
| Direction | =⊥ | Output the target image. Output the direction. | Output the target image. Output the direction. |
| | ∈ others | Output the target image. Output the direction. | Separate the target image into plural sub-images using the separation path in the "direction". Output the direction. |

If the variable "direction" is a value other than unidentifiable (⊥) and if the variable "state" is a value other than a single character string (T), a single character (C), or a unidentifiable (⊥) (that is, if the variable "state" is a single paragraph (P)), the image separation module 3460 selects the separation path in the direction determined by the separation direction determination module 3250 from the separation path storage module 3435, and separates an image received by the image receiving module 3210 into plural sub-images. If the variable "direction" is unidentifiable (⊥) or if the variable "state" is a single character string (T), a single character (C), or unidentifiable (⊥) (that is, if the variable "state" is a value other than a single paragraph (P)), the image separation module 3460 outputs the target document image as it is without selecting a separation path or separating the image.

<Experiment Results B>

Experiment results according to the exemplary embodiment given in the section <B> will be described in comparison with those obtained without using the exemplary embodiment.

First, experiment results obtained without using this exemplary embodiment will be described. Experiment results may be obtained using, for example, techniques of the related art instead of using this exemplary embodiment. That is, generally two approaches may be used: an approach based on projection distribution and an approach based on connected components. Techniques based on projection distribution of a rectangle circumscribing connected components may be regarded as belonging to the approach based on projection distribution.

Feature values of basic information (that is, projection distribution, connected components) are calculated, and the feature values in multiple directions are compared to determine the direction of a character string or cut out the character string.

In the determination of the character string direction based on projection distribution, the comparison is performed in terms of the feature of the values of the projection distribution or the profile of the distribution (for example, peaks and troughs). For example, in Japanese Unexamined Patent Application Publication No. 04-311283, direction determination is performed using, as a feature value, a maximum value of the horizontal and vertical projection distribution.

In the determination of a character string direction based on connected components, the comparison is performed in terms of the feature of the position relationship between the connected components. For example, in Japanese Unexamined Patent Application Publication No. 05-073718, direction determination is performed by comparing the number of pairs of connected components for which a minimum distance is obtained in the horizontal direction with the number of pairs of connected components for which a minimum distance is obtained in the vertical direction. In contrast, for example, in Japanese Unexamined Patent Application Publication No. 2000-090194, direction determination is performed by comparing the average interval between a rectangle circumscribing connected components in the horizontal direction with the average interval between a rectangle circumscribing connected components in the vertical direction.

In the cut-out of a character string based on projection distribution, in the projection distribution in the direction of the character string, a projection distribution trough corresponding to a gap in the character string is specified and is used as a separation boundary.

In the cut-out of a character string based on connected components, adjacent connected components are regarded as a character string and are integrated while efficiently using information on the direction of the character string if the direction of the character string is known. Further, a method capable of merging the determination of the direction of a character string and the cut-out of the character string by using integrated connected components, as disclosed in the article (L O'Gorman, "The Document Spectrum for Page Layout Analysis," IEEE TPAMI, Vol. 15, No. 11, November 1993, pp 1162-1173), may also be used.

FIGS. 35A and 35B illustrates an example of projection distribution. FIG. 35A illustrates an example of horizontal and vertical projection distributions, and FIG. 35B illustrates an example of horizontal and vertical projection distributions of rectangles circumscribing connected components. In the document image illustrated in the example in FIGS. 35A and 35B, characters are densely arranged. It may be difficult to obtain projection distribution and connected components effective for the cut-out of character strings from such an image. In general, projection distribution is susceptible to the influence of skew on a document image, and connected components are susceptible to the influence of single-character patterns (language, decoration, etc.) and non-character patterns (underlines, noises, etc.) of a document image. In particular, as illustrated in the example in FIGS. 35A and 35B, the above influences are noticeable in a document image where characters are densely arranged. In this situation, information on separation boundaries between character strings may be less likely to appear, and a sufficient difference between the horizontal and vertical projection distributions may be less likely to appear.

Next, a separation path used in the exemplary embodiment in the section <B> will be described using FIGS. 36A to 36C and 37A to 37C. FIGS. 36A to 36C and 37A to 37C illustrate an example of horizontal and vertical separation paths, which are separation paths calculated in the horizontal and vertical directions of a paragraph image as a target image. While separation paths in the same direction as the direction of character strings forming a paragraph have a nearly straight line shape, separation paths in a different direction from the direction of the character strings are non-linear or curved (see FIGS. 36A to 36C). Or, even separation paths having an equivalent degree of curve exhibit different intervals (see FIGS. 37A to 37C). In the exemplary embodiment in the section <B>, quantitative evaluations of the above features are used and compared as feature values to implement the determination of a character string direction. Specifically, feature values are extracted on the basis of the number of separation paths, the positions and shapes of the individual separation paths, and pixel values along the paths.

In the exemplary embodiment in the section <B>, furthermore, it is determined whether the target image is a single paragraph image, a single character image, or a single character string image on the basis of the number of separation paths. FIGS. 38A to 38C illustrate an example of the manner in which the determination is performed. That is, the determination is performed using the assumption that there is an efficient difference for the determination of a character string direction between a separation path in a correct direction and a separation path in a wrong direction.

FIGS. 39A to 39C, 40A to 40C, and 41 illustrate an example of the cut out of character strings according to the exemplary embodiment in the section <B>.

In the example in FIGS. 39A to 39C, a result of the cut out of character strings according to the third example of the exemplary embodiment is illustrated. A document image is received, and it is determined that state=P, that is, the image is a single paragraph image. It is also determined that the direction of the character strings is horizontal. As a result, it may be observed that adjacent (close) character strings are separated by separation paths (see enlarged views in FIGS. 39B and 39C).

FIG. 40A illustrates an example of a result of the cut out operation according to the exemplary embodiment in the section <B>, FIG. 40B illustrates an example of the target image and the projection distribution, and FIG. 40C illustrates an example of rectangles circumscribing connected components. As may be seen from the example in FIGS. 40A to 40C, according to the exemplary embodiment in the section <B>, separation boundaries which do not appear in the projection distribution are specified, plural connected characters are separated, erroneously separated single characters are integrated, a character string direction is determined, and character strings are also cut out.

Also, as may be seen from the example in FIG. 41, not only the image as illustrated in the example in FIG. 39B in which characters are densely arranged but also the image as illustrated in the example in FIG. 37A in which the gaps between character strings are large are subjected to cut out of character strings according to the exemplary embodiment in the section <B>.

An example hardware configuration of an image processing apparatus according to an exemplary embodiment of the present invention will be described with reference to FIG. 42. The configuration illustrated in FIG. 42 may be an example hardware configuration of, for example, a personal computer (PC) or the like, which includes a data reader 4217 such as a scanner, and a data output unit 4218 such as a printer.

A CPU 4201 may be a controller configured to execute a process according to a computer program describing sequences executed by the various modules described above in the foregoing exemplary embodiments, such as the forward path information calculation module 1110, the path selection module 1120, the reverse path information calculation module 1130, the image separation module 1710, the separation path calculation module 3120, the image separation module 3130, the horizontal separation path calculation module 3220, the vertical separation path calculation module 3230, the path feature value calculation module 3240, the separation direction determination module 3250, and the image separation module 3460.

A read only memory (ROM) 4202 stores a program, arithmetic operation parameters, and the like used by the CPU 4201. A RAM 4203 stores a program used for the execution of the CPU 4201, parameters that change as appropriate during the execution, and the like. The CPU 4201, the ROM 4202, and the RAM 4203 are connected to one another via a host bus 4204 including a CPU bus or the like.

The host bus 4204 is connected to an external bus 4206 such as a Peripheral Component Interconnect/Interface (PCI) bus via a bridge 4205.

A keyboard 4208 and a pointing device 4209 such as a mouse may be input devices operated by an operator. A display 4210 may be a liquid crystal display device, a cathode ray tube (CRT), or the like, and displays various information as text of image information.

A hard disk drive (HDD) 4211 has a built-in hard disk, and drives the hard disk to record or reproduce program or information executed by the CPU 4201. The hard disk may store a target image, path information, feature values, character string images, and the like. The hard disk may further store various computer programs such as other various data processing programs.

The drive 4212 reads data or a program recorded on a removable recording medium 4213 placed therein, such as a magnetic disk, an optical disk, a magneto-optical disk, or a semiconductor memory, and supplies the data or program to the RAM 4203 connected thereto via the interface 4207, the external bus 4206, the bridge 4205, and the host bus 4204. The removable recording medium 4213 may also be used as a data recording area similar to the hard disk.

A connection port 4214 may be a port to which an external connection device 4215 is connected, and has a connection unit such as a universal serial bus (USB) or an Institute of Electrical and Electronic Engineers (IEEE) 1394 connection unit. The connection port 4214 is connected to the CPU 4201 and the like via the interface 4207, the external bus 4206, the bridge 4205, the host bus 4204, and any other suitable device. A communication unit 4216 is connected to a network and executes a data communication process with an external device. The data reader 4217 may be, for example, a scanner, and may execute a process for reading a document. The data output unit 4218 may be, for example, a printer, and may execute a process for outputting document data.

The hardware configuration of the image processing apparatus illustrated in FIG. 42 represents merely an example configuration, and exemplary embodiments of the present invention are not limited to the configuration illustrated in FIG. 42. Any configuration capable of executing the modules described in the above exemplary embodiments may be used. For example, some modules may be configured using dedicated hardware (for example, an application specific integrated circuit (ASIC) or the like), and other modules may be provided in an external system and may be connected via a communication line. Alternatively, multiple systems each having the configuration illustrated in FIG. 42 may be connected to one another via a communication line and may operate in association with one another. Furthermore, the system illustrated in FIG. 42 may be incorporated in a copier, a facsimile machine, a scanner, a printer, a multifunctional device (an image processing apparatus having at least two of functions such as scanner, printer, copier, and facsimile functions), or the like.

In the exemplary embodiment described above in the section <A>, a target image has been described in the context of, by way of example, an image containing plural characters written in one horizontal row. However, it is to be understood that a character image containing characters written vertically may be used. In this case, the terms "upward" and "downward" are to be read as "rightward" and "leftward". Further, the exemplary embodiment may also be used for, in addition to the separation of a character image area, the separation of areas of other object images (for example, an image of a person in a photograph, a face image, etc.).

In the exemplary embodiment described above in the section <B>, a character string image has been described in the context of, by way of example, an image of a character string written horizontally. However, it is to be understood that an image of a character string written vertically may be used. In this case, the terms "upward" and "downward" are to be read as "rightward" and "leftward". For example, the example illustrated in FIG. 40A may an example of a character string written vertically.

While the foregoing exemplary embodiments have been described using mathematical expressions, each individual mathematical expression may include an equivalent thereof. The term "equivalent" includes, in addition to the mathematical expression itself, a modification of the mathematical expression that would not influence a final result, and the solution of the mathematical expression with an algorithmic solution.

The foregoing exemplary embodiments (including the examples) may be combined (for example, a module in a certain exemplary embodiment may be used in another exemplary embodiment, or a module in a certain exemplary embodiment may be replaced by a module in another exemplary embodiment), and the processes of each module may use any technique of the related art.

A program described herein may be provided in the form of being stored in a recording medium, or may be provided via a communication medium. In this case, for example, a computer readable medium storing the program described above may constitute an exemplary embodiment of the present invention.

The computer readable recording medium may be a computer readable recording medium storing a program, which is used for installation, execution, distribution, or the like of the program.

Examples of the recording medium include digital versatile discs (DVDs) including discs complying with a DVD Forum standard, such as DVD-Recordable (DVD-R), DVD-Rewritable (DVD-RW), and DVD-RAM discs, and discs complying with a format supported by the DVD+RW Alliance, such as DVD+R and DVD+RW discs, compact discs (CDs) including compact disc read-only memory (CD-ROM), CD-Recordable (CD-R), and CD-Rewritable (CD-RW) discs, a Blu-ray Disc (registered trademark), a magneto-optical (MO) disk, a flexible disk (FD), a magnetic tape, a hard disk, a ROM, an electrically erasable programmable read-only memory (EEPROM), a flash memory, and a RAM.

The above program or a portion thereof may be recorded in any of the above recording media for saving, distribution, or the like, or may be transmitted via communication using a transmission medium such as a wired network used for a local area network (LAN), a metropolitan area network (MAN), a wide area network (WAN), the Internet, an intranet, an extranet, and the like, a wireless communication network, or a combination thereof, or carried on a carrier.

Furthermore, the program described above may be a part of another program, or may be recorded on a recording medium together with a different program. The program may also be recorded separately on plural recording media. The program may also be recorded in any form being capable of recovered such as compressed or encoded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a receiving unit that receives an image including at least a character image;
a path calculation unit that calculates a separation path in the image received by the receiving unit, the separation path comprising a line segment that separates a character image from the image and is defined by a convergence of paths about an outer boundary of the character image; and
a separation unit that separates the image received by the receiving unit into a plurality of character images using the separation path calculated by the path calculation unit,
wherein the path calculation unit calculates the separation path within a predetermined range including a portion of a character image in the image so that a cumulative value of luminance values of pixels along the separation path satisfies a predetermined condition.

2. The image processing apparatus according to claim 1, further comprising:
a feature value calculation unit; and
a selection unit, wherein the path calculation unit calculates separation paths in a plurality of directions, wherein the feature value calculation unit calculates feature values of the separation paths in the plurality of directions calculated by the path calculation unit, wherein the selection unit determines a direction in which the image received by the receiving unit is to be separated and a state of a character image in the image in accordance with the feature values calculated by the feature value calculation unit, and selects a separation path among the separation paths in the plurality of directions in accordance with determination results, and wherein the separation unit separates the image received by the receiving unit into a plurality of sub-images using the separation path selected by the selection unit.

3. The image processing apparatus according to claim 1, wherein the path calculation unit calculates a separation path within a predetermined range including a portion of a character image in the image so that a cumulative value of products of the luminance values of pixels along the separation path and weight coefficients based on a movement of the separation path satisfies the predetermined condition.

4. The image processing apparatus according to claim 1, wherein the path calculation unit determines whether a width of a gap between adjacent separation paths satisfies a third predetermined condition, and, based on a determination corresponding to the third predetermined condition, the path calculation unit combines the adjacent separation paths into one separation path, or wherein the path calculation unit determines whether a cumulative value of luminance values of pixels in the gap between adjacent separation paths satisfies a fourth predetermined condition, and, based on a determination corresponding to the fourth predetermined condition, the path calculation unit combines the adjacent separation paths into one separation path.

5. A non-transitory computer readable medium storing a program causing a computer to execute a process for image processing, the process comprising:

receiving an image including at least a character image;

calculating a separation path in the received image, the separation path comprising a line segment that separates a character image from the image and is defined by a convergence of paths about an outer boundary of the character image; and separating the received image into a plurality of character images using the calculated separation path, wherein in the calculating, a separation path is calculated within a predetermined range including a portion of a character image in the image so that a cumulative value of luminance values of pixels along the separation path satisfies a predetermined condition.

6. An image processing method comprising:

receiving an image including at least a character image;

calculating a separation path in the received image, the separation path comprising a line segment that separates a character image from the image and is defined by a convergence of paths about an outer boundary of the character image; and separating the received image into a plurality of character images using the calculated separation path, wherein in the calculating, the separation path is calculated within a predetermined range including a portion of a character image in the image so that a cumulative value of luminance values of pixels along the separation path satisfies a predetermined condition.

7. The image processing method according to claim 6, wherein, in the calculating, the separation path is calculated within a predetermined range including a portion of a character image in the image so that a cumulative value of products of the luminance values of pixels along the separation path and weight coefficients based on a movement of the separation path satisfies the predetermined condition.

8. The image processing method according to claim 6, further comprising:

determining whether a width of a gap between adjacent separation paths satisfies a third predetermined condition, and combining the adjacent separation paths into one separation path based on a determination corresponding to the third predetermined condition.

9. The image processing method according to claim 6, further comprising:

determining whether a cumulative value of luminance values of pixels in the gap between adjacent separation paths satisfies a fourth predetermined condition, and combining the adjacent separation paths into one separation path based on a determination corresponding to the fourth predetermined condition.

10. The image processing apparatus according to claim 1, wherein the line segment is only disposed in gaps between character images from the image.

11. An image processing apparatus comprising:

a receiving unit that receives an image including at least a character image;

a path calculation unit that calculates a separation path in the image received by the receiving unit, the separation path comprising a line segment that separates a character image from the image; and a separation unit that separates the image received by the receiving unit into a plurality of character images using the separation path calculated by the path calculation unit, wherein the path calculation unit calculates a separation path within a predetermined range including a portion of a character image in the image so that a cumulative value of products of the luminance values of pixels along the separation path and weight coefficients based on a movement of the separation path satisfies the predetermined condition.

12. An image processing apparatus comprising:

a receiving unit that receives an image including at least a character image;

a path calculation unit that calculates a separation path in the image received by the receiving unit, the separation path comprising a line segment that separates a character image from the image; and a separation unit that separates the image received by the receiving unit into a plurality of character images using the separation path calculated by the path calculation unit, wherein the path calculation unit calculates the separation path within a predetermined range including a portion of a character image in the image so that a cumulative value of luminance values of pixels along the separation path satisfies a predetermined condition, and wherein the path calculation unit determines whether a width of a gap between adjacent separation paths satisfies a third predetermined condition, and, based on a determination corresponding to the third predetermined condition, the path calculation unit combines the adjacent separation paths into one separation path.

13. An image processing apparatus comprising:
a receiving unit that receives an image including at least a character image;
a path calculation unit that calculates a separation path in the image received by the receiving unit, the separation path comprising a line segment that separates a character image from the image; and
a separation unit that separates the image received by the receiving unit into a plurality of character images using the separation path calculated by the path calculation unit,
wherein the path calculation unit calculates the separation path within a predetermined range including a portion of a character image in the image so that a cumulative value of luminance values of pixels along the separation path satisfies a predetermined condition, and
wherein the path calculation unit determines whether a cumulative value of luminance values of pixels in the gap between adjacent separation paths satisfies a fourth predetermined condition, and, based on a determination corresponding to the fourth predetermined condition, the path calculation unit combines the adjacent separation paths into one separation path.

* * * * *